US012531485B2

(12) United States Patent
Kojima

(10) Patent No.: US 12,531,485 B2
(45) Date of Patent: Jan. 20, 2026

(54) SEMICONDUCTOR DEVICE

(71) Applicant: Mitsubishi Electric Corporation, Tokyo (JP)

(72) Inventor: Tomokazu Kojima, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 322 days.

(21) Appl. No.: 18/552,806

(22) PCT Filed: Apr. 26, 2021

(86) PCT No.: PCT/JP2021/016623

§ 371 (c)(1),
(2) Date: Sep. 27, 2023

(87) PCT Pub. No.: WO2022/230018

PCT Pub. Date: Nov. 3, 2022

(65) Prior Publication Data

US 2024/0372471 A1 Nov. 7, 2024

(51) Int. Cl.

*H02M 3/158* (2006.01)
*H02M 1/08* (2006.01)
*H02M 1/36* (2007.01)
*H02M 1/32* (2007.01)

(52) U.S. Cl.

CPC ............. *H02M 3/158* (2013.01); *H02M 1/08* (2013.01); *H02M 1/36* (2013.01); *H02M 1/32* (2013.01)

(58) Field of Classification Search

CPC .......... H02M 3/158; H02M 1/08; H02M 1/32; H02M 1/36

See application file for complete search history.

(56) References Cited

U.S. PATENT DOCUMENTS

| | | | | |
|---|---|---|---|---|
| 5,942,677 | A | 8/1999 | Vulih et al. | |
| 8,937,797 | B2 | 1/2015 | Pirchio et al. | |
| 2021/0218360 | A1 * | 7/2021 | Ohara | H02P 29/024 |
| 2022/0311233 | A1 * | 9/2022 | Kojima | H02H 1/0007 |

OTHER PUBLICATIONS

International Search Report (PCT/ISA/210) with translation and Written Opinion (PCT/ISA/237) mailed on Jul. 20, 2021, by the Japan Patent Office as the International Searching Authority for International Application No. PCT/JP2021/016623. (9 pages).

* cited by examiner

*Primary Examiner* — Alex Torres-Rivera
(74) *Attorney, Agent, or Firm* — BUCHANAN, INGERSOLL & ROONEY PC

(57) ABSTRACT

A first output transistor is connected between an output node connected to an output terminal and a ground terminal, and a second output transistor is connected between a power supply terminal and the output node. When disconnection of the ground terminal occurs, at least the first output transistor is turned off in response to a disconnection detection signal from a disconnection detection circuit, and a signal input to each circuit changes, causing a semiconductor device to transition to a power-off state.

9 Claims, 22 Drawing Sheets

SEMICONDUCTOR DEVICE

TECHNICAL FIELD

The present disclosure relates to a semiconductor device.

BACKGROUND ART

In semiconductor devices such as large-scale integrated circuits (LSIs) and integrated circuits (ICs) mounted on industrial devices, there has been a demand for enhancement of fail-safe functions in case of disconnection.

For example, U.S. Pat. No. 5,942,677 (PTL 1) describes a configuration for fail-safe in case of disconnection in a knock sensor system in which an output signal from a knock sensor is processed in an IC to be input to a microprocessor in a subsequent stage. Specifically, there is a description of a configuration of a detection circuit for detecting disconnection of an output signal line of the IC from the knock sensor, and when the disconnection is detected, an output voltage from the IC to the microprocessor is forcedly set to a voltage (0 [V]) outside of a voltage range (0.5 to 5 [V]) in a normal state (at a time of non-occurrence of disconnection).

In PTL 1, when the output signal line of the knock sensor is disconnected, the IC on the following stage is reliably notified of occurrence of disconnection.

CITATION LIST

Patent Literature

PTL 1: U.S. Pat. No. 5,942,677

SUMMARY OF INVENTION

Technical Problem

However, in a semiconductor device, a power supply line and a ground line may also be disconnected in addition to disconnection of a signal line described in PTL 1. The detection circuit in PTL 1 fails to detect such power supply lines and ground lines and moreover does not consider a fail-safe function for such disconnection.

On the other hand, as a common configuration of a semiconductor device, an output terminal for electrical contact with outside of the semiconductor device is sometimes connected to a power supply line and a ground line through a transistor on an output stage for driving a voltage at the output terminal. The back gate terminal (body) of the transistor forming the output stage is usually connected to the power supply line or the ground line.

The output terminal may be pulled up or pulled down outside the semiconductor device. Thus, when one of the power supply line and the ground line is disconnected inside the semiconductor device, abnormal current may be produced between the other line having no disconnection and the pull-up or the pull-down outside the semiconductor device, due to a current path formed by turning-on of the body diode of the transistor on the output stage.

The present disclosure is made in order to solve such a problem and an object of the present disclosure is to prevent occurrence of abnormal current at a time of occurrence of disconnection of a power supply line or a ground line.

Solution to Problem

An aspect of the present disclosure provides a semiconductor device. The semiconductor device includes a first power supply terminal receiving a first power supply voltage (GND), a second power supply terminal receiving a second power supply voltage (VCC) higher than the first power supply voltage, an output terminal capable of electrical contact from outside of the semiconductor device, a first circuit having first and second output transistors, a disconnection detection circuit, and an output transistor control circuit. The first output transistor is electrically connected between an output node connected to the output terminal and the first power supply terminal to feed current in accordance with a first control voltage input to a gate of the first output transistor from the output node to the first power supply terminal. The second output transistor is electrically connected between the second power supply terminal and the output node to feed current in accordance with a second control voltage input to a gate of the second output transistor from the second power supply terminal to the output node. The disconnection detection circuit detects at least one of first disconnection in a path of the first power supply voltage related to the first power supply terminal and second disconnection in a path of the second power supply voltage related to the second power supply terminal. The output transistor control circuit is arranged corresponding to at least one of the first and second output transistors. When the first disconnection is detected, the output transistor control circuit arranged corresponding to the first output transistor interrupts a path through which the first control voltage is input to the gate of the first output transistor, and turns off the first output transistor. When the second disconnection is detected, the output transistor control circuit arranged corresponding to the second output transistor interrupts a path through which the second control voltage is input to the gate of the second output transistor, and turns off the second output transistor. In response to detection of disconnection by the disconnection detection circuit, the semiconductor device transitions to a power-off state. The disconnection detection circuit has a power-off circuit to interrupt current flowing between the first power supply terminal and the second power supply terminal inside the disconnection detection circuit, in the power-off state of the semiconductor device.

Advantageous Effects of Invention

According to the present disclosure, when the first disconnection on the first power supply voltage side or the second disconnection on the second power supply voltage side occurs in a state in which a pull-up resistor or a pull-down resistor is connected to the output terminal outside the semiconductor device, the first or second output transistor is forcibly turned off by the output transistor control circuit and the semiconductor device is brought into a power-off state to prevent a voltage increase of the first power supply terminal or a voltage decrease of the second power supply terminal, thereby preventing occurrence of abnormal current between the pull-up resistor and the disconnected first power supply terminal or between the pull-down resistor and the disconnected second power supply terminal.

DESCRIPTION OF EMBODIMENTS

Figure 1:
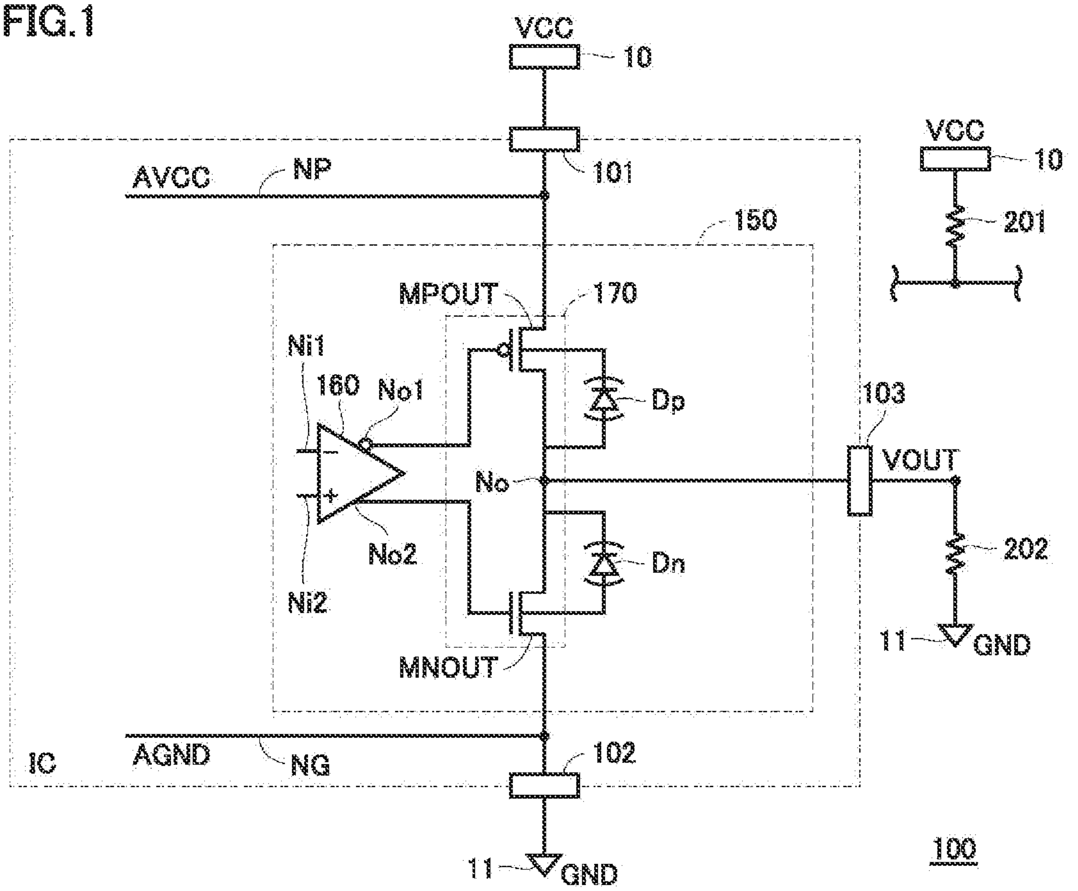
FIG. 1 is a circuit diagram schematically illustrating a configuration of a semiconductor device according to a comparative example in which an output terminal is pulled down.

Embodiments of the present disclosure will be described in detail below with reference to the drawings. In the following, like or corresponding parts in the drawings are denoted by like reference signs and a description thereof is basically not repeated.

First Embodiment

In a first embodiment, a circuit configuration for handling disconnection related to a ground line in a semiconductor device will be described.

(Abnormal Current Due to Disconnection Related to Ground Line)

First of all, referring to FIG. 1 and FIG. 2, abnormal current will be described in a case where disconnection occurs in a ground line inside a semiconductor device in a configuration in which an output terminal of the semiconductor device is pulled down outside the semiconductor device.

FIG. 1 is a circuit diagram schematically illustrating a configuration of a semiconductor device 100 according to a comparative example.

Semiconductor device 100 shown in FIG. 1 includes a power supply terminal 101, a ground terminal 102, an output terminal 103, a power supply node NP, a GND node NG, and an operational amplifier circuit 150.

Power supply terminal 101 is electrically connected to a power supply 10 for supplying a power supply voltage VCC (for example, 5 [V]) through a power supply line. Ground terminal 102 is electrically connected to a reference voltage node 11 for supplying a ground voltage GND (0 [V]). Power supply node NP is connected to power supply terminal 101 and is a generic term for lines that supply power supply voltage VCC in the semiconductor device. Similarly, GND node NG is connected to ground terminal 102 and is a generic term for lines that supply ground voltage GND in the semiconductor device. Inside the semiconductor device, unless disconnection occurs, power supply terminal 101 and power supply node NP are electrically equivalent, and ground terminal 102 and GND node NG are also electrically equivalent. Hereinafter, a voltage of power supply node NP is denoted as AVCC, and a voltage of GND node NG is denoted as AGND.

In the first embodiment, it is assumed that a pull-up resistor 201 or a pull-down resistor 202 is connected to output terminal 103 outside the semiconductor device. As described above, in the first embodiment, output terminal 103 is electrically connected to reference voltage node 11 through pull-down resistor 202 outside the semiconductor device.

Operational amplifier circuit 150 includes a differential amplifier 160 and an output stage 170. Operational amplifier circuit 150 is described as a representative example of a circuit element connected between power supply node NP and GND node NG and includes output stage 170 that may serve as a path for abnormal current described later.

Differential amplifier 160 has an inversion input node Ni1 and a non-inversion input node Ni2, and an inversion output node No1 and a non-inversion output node No2. A voltage difference produced between inversion output node No1 and non-inversion output node No2 is the one obtained by amplifying a voltage difference between inversion input node Ni1 and non-inversion input node Ni2. For example, analog voltages of opposite phases are input to inversion input node Ni1 and non-inversion input node Ni2. A circuit configuration of a common differential amplifier using a field effect transistor (MOS transistor) can be applied as desired to an internal configuration of differential amplifier 160.

Output stage 170 includes a P-type transistor (output transistor) MPOUT and an N-type transistor (output transistor) MNOUT. Output transistor MPOUT is connected between power supply node NP and output node No connected to output terminal 103. Output transistor MNOUT is connected between output node No and GND node NG. The gate of output transistor MPOUT is connected to inversion output node No1 (– side) of differential amplifier 160, and the gate of output transistor MNOUT is connected to non-inversion output node No2 (+ side) of differential amplifier 160.

Output transistors MPOUT, MNOUT are driven in accordance with output voltages of differential amplifier 160, that is, voltages of inversion output node No1 (– side) and non-inversion output node No2 (+ side), whereby output voltage VOUT of operational amplifier circuit 150 is produced at output node No.

Semiconductor device 100 operates as an operational amplifier that outputs output voltage VOUT of operational amplifier circuit 150 in accordance with an input signal to operational amplifier circuit 150, from output terminal 103 to the outside of semiconductor device 100. When analog voltages of phases opposite to each other are input to inversion input node Ni1 and non-inversion input node Ni2 as described above, output voltage VOUT is obtained by amplifying the analog voltages (– side input) in a range of ground voltage GND to power supply voltage VCC.

Hereinafter, a state in which power supply voltage VCC and ground voltage GND are supplied normally to the semiconductor device is also referred to as "normal state".

First of all, the operation in a normal state of semiconductor device 100 will be described. For example, an analog voltage such as an audio signal, an image signal, or an amplified signal of a sensor input (for example, a signal obtained by converting and amplifying an output of a Hall element) is input to inversion input node Ni1 (– side) and non-inversion input node Ni2 (+ side) of differential amplifier 160. Alternatively, an analog voltage obtained by converting a digital signal by a D/A converter (not shown) arranged on the preceding stage of operational amplifier circuit 150 may be input to differential amplifier 160.

Voltages having a voltage difference in accordance with input voltages to inversion input node Ni1 (– side) and non-inversion input node Ni2 (+ side) are respectively produced at inversion output node No1 (– side) and non-inversion output node No2 (+ side) of differential amplifier 160. Currents of output transistors MNOUT and MPOUT change in accordance with voltages at inversion input node Ni1 (– side) and non-inversion input node Ni2 (+ side), so that output voltage VOUT in accordance with an input signal is produced at output node No and output from output terminal 103.

Output voltage VOUT follows an output voltage of operational amplifier circuit 150 and therefore is assumed to be an analog output rather than a digital output of GND (0 [V]) or VCC. A voltage in a range from approximately GND (0 [V])+20 [mV] to approximately VCC (for example, 5 [V])-20 [mv] based on an input signal (analog voltage, or a D/A converted voltage of a digital signal) is output from output terminal 103 in the form of a DC or AC voltage (sinusoidal wave or pulsed wave).

The operation of semiconductor device 100 when ground voltage GND is not supplied will now be described.

Figure 2:
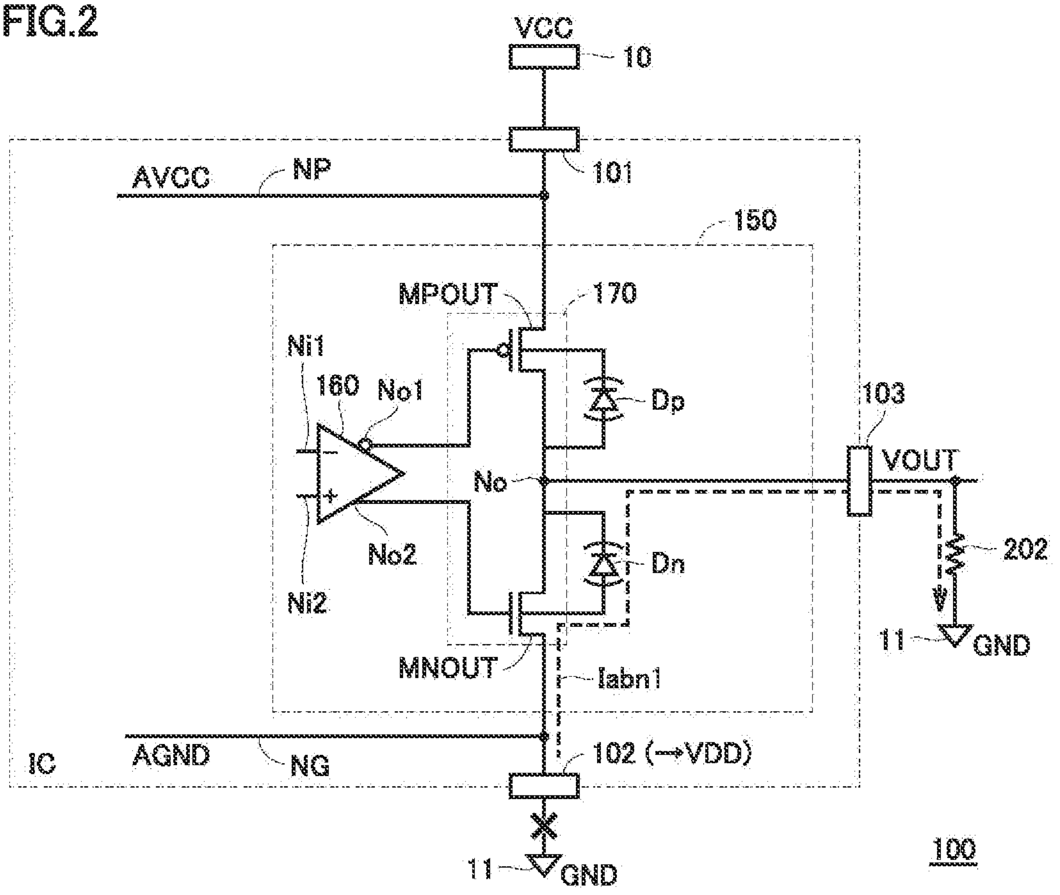
FIG. 2 is a circuit diagram at a time of disconnection on the ground line side of the semiconductor device shown in FIG. 1.

FIG. 2 shows a circuit diagram at a time when disconnection occurs on the ground line side of semiconductor device 100 shown in FIG. 1 (hereinafter also referred to as at a time of GND disconnection).

As shown in FIG. 2, when disconnection occurs between reference voltage node 11 and ground terminal 102, ground terminal 102 is opened and GND node NG is brought into a high impedance (Hi-Z) state. As a result, semiconductor device 100 is provided only with power supply voltage VCC, and the voltage AGND of GND node NG gradually increases over time and ultimately converges to VCC (5 [V]).

On the other hand, body diodes Dp and Dn are respectively formed for output transistors MPOUT (P type) and MNOUT that constitute output stage 170. Body diode Dp is formed such that the direction from output node No to power supply node NP is forward direction. On the other hand, body diode Dn is formed such that the direction from GND node NG to output node No is a forward direction. In a normal state, since power supply node NP is fixed to power supply voltage VCC, and GND node NG is fixed to ground voltage GND, both of body diodes Dp and Dn are reverse-biased.

At a time of GND disconnection, voltage AGND of GND node NG increases, so that body diode Dn of output transistor MNOUT may be conducting. Therefore, when pull-down resistor 202 is connected to output terminal 103 outside semiconductor device 100, abnormal current Iabn1 shown by a dotted line in the figure may continuously occur through pull-down resistor 202, in a path of GND node NG (voltage increase)—body diode Dn of output transistor MNOUT—output node No—pull-down resistor 202—reference voltage node 11 (GND).

When such current occurs, current by the body diode induces latch up, leading to not only consumption of excessive current but also destruction of the chip. Further, output voltage VOUT of output terminal 103 may become unstable.

(Prevention of Abnormal Current at GND Disconnection According to First Embodiment)

Figure 3:
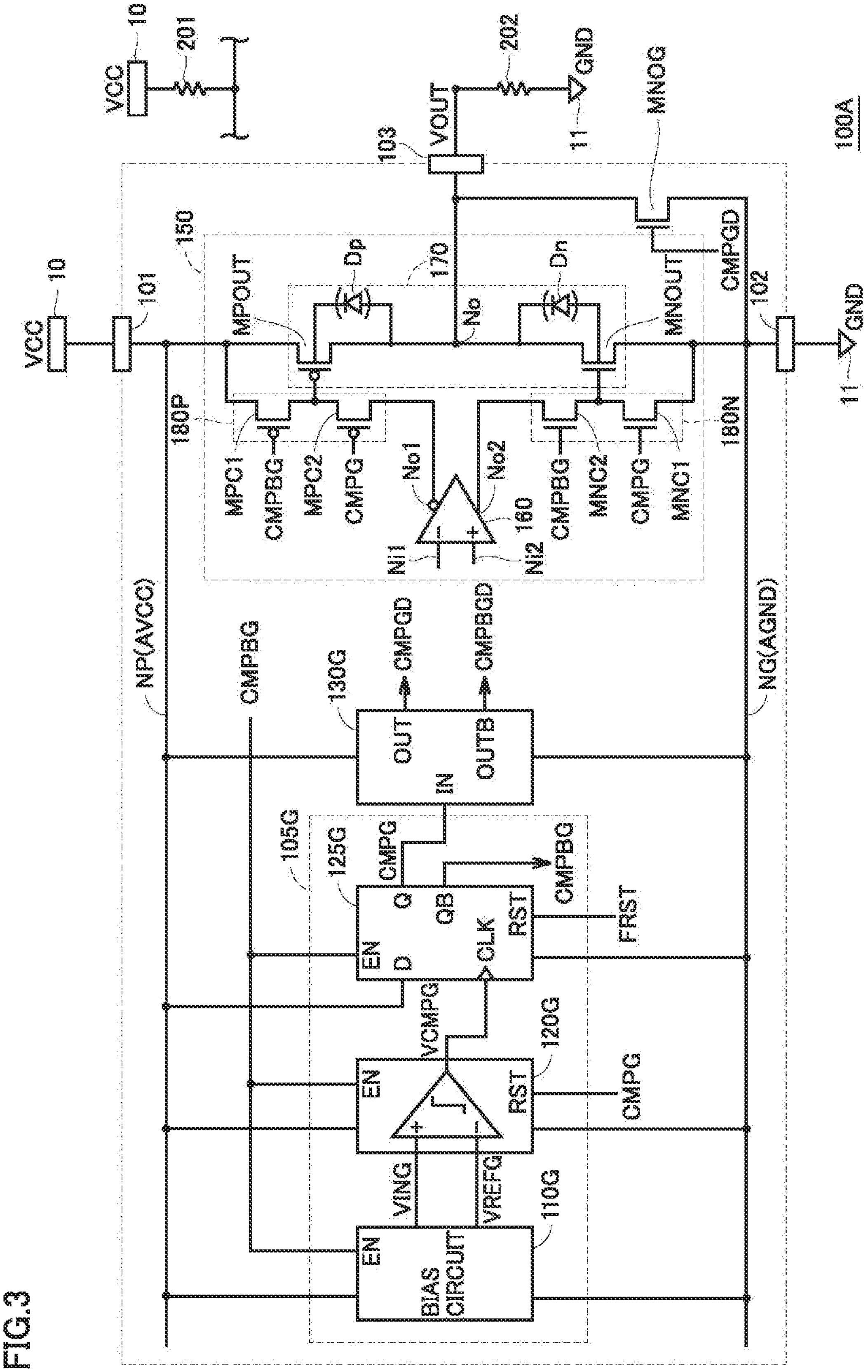
FIG. 3 is a block diagram illustrating a configuration of a semiconductor device according to a first embodiment.

FIG. 3 shows a block diagram illustrating a configuration of a semiconductor device 100A according to the first embodiment.

As shown in FIG. 3, semiconductor device 100A according to the first embodiment further includes, in addition to the configuration of semiconductor device 100 shown in FIG. 1, a disconnection detection circuit 105G, a delay circuit 130G, output transistor control circuits 180P, 180N, and a pull-down transistor MNOG, as a configuration for preventing abnormal current at a time of GND disconnection.

Output transistor control circuit 180P includes P-type transistors MPC1 and MPC2. Transistor MPC1 is connected between the gate of output transistor MPOUT and power supply node NP. When transistor MPC1 turns on, the gate and the source of output transistor MPOUT attain the same potential to turn off output transistor MPOUT. Transistor MPC2 is connected between the gate of output transistor MPOUT and inversion output node No1. When transistor MPC2 turns on, an output voltage from differential amplifier 160 to inversion output node No1 (− side) is input to the gate of output transistor MPOUT.

Output transistor control circuit 180N includes N-type transistors MNC1 and MMC2. Transistor MNC1 is connected between the gate of output transistor MNOUT and GND node NG. When transistor MNC1 turns on, the gate and the source of output transistor MNOUT attain the same potential to turn off output transistor MNOUT. Transistor MNC2 is connected between the gate of output transistor MNOUT and non-inversion output node No2. When transistor MNC2 turns on, an output voltage from differential amplifier 160 to non-inversion output node No2 (+ side) is input to the gate of output transistor MNOUT.

Pull-down transistor MNOG is connected between output node No connected to output terminal 103, and GND node NG. In other words, pull-down transistor MNOG is connected between output node No and GND node NG in parallel with output transistor MNOUT.

In the present embodiment, ground voltage GND corresponds to an embodiment of "first power supply voltage", power supply voltage VCC corresponds to an embodiment of "second power supply voltage", ground terminal 102 corresponds to an embodiment of "first power supply terminal", and power supply terminal 101 corresponds to an embodiment of "second power supply terminal". Operational amplifier circuit 150 having output transistors MPOUT, MNOUT corresponds to an embodiment of "first circuit", output transistor MNOUT on the ground terminal 102 side corresponds to "first output transistor", and output transistor MPOUT on the power supply terminal 101 side corresponds to "second output transistor". An input voltage from differential amplifier 160 to the gate of output transistor MNOUT (that is, voltage of non-inversion output node No2) corresponds to an embodiment of "first control voltage", and an input voltage from differential amplifier 160 to the gate of output transistor MPOUT (that is, voltage of inversion output node No1) corresponds to an embodiment of "second control voltage".

Disconnection detection circuit 105G generates disconnection detection signals CMPG and CMPBG that are control signals of output transistor control circuits 180P, 180N, based on voltage AVCC of power supply node NP and voltage AGND of GND node NG.

As will be clear from the following description, disconnection detection signal CMPG is initialized to logic low level (hereinafter simply referred to as "L level") and thereafter kept at L level in a normal state in which GND disconnection does not occur. On the other hand, when GND disconnection occurs, disconnection detection signal CMPG changes from L level to H level. Disconnection detection signal CMPBG is an inversion signal of disconnection detection signal CMPG, and kept at H level in a normal state and kept at L level when GND disconnection occurs.

Disconnection detection signal CMPG is input to the gates of transistors MPC2, MNC1 of output transistor control circuits 180P, 180N. Disconnection detection signal CMPBG is input to the gates of transistors MPC1, MNC2 of output transistor control circuits 180P, 180N. Therefore, it is understood that in output transistor control circuits 180P, 180N, the pair of transistors MPC1 and MNC1 and the pair of transistors MPC2 and MNC2 are complementarily turned on/off.

Delay circuit 130G generates delay signals CMPGD and CMPBGD in which disconnection detection signals CMPG and CMPBG are delayed, respectively, in accordance with a predetermined delay time Td. Delay signal CMPGD is input to the gate of pull-down transistor MNOG.

Referring to FIG. 3 as well as FIG. 4 to FIG. 8, a configuration of disconnection detection circuit 105G will now be described in detail. Disconnection detection circuit 105G includes a bias circuit 110G, a comparator 120G, and a D flip-flop 125G. Disconnection detection signal CMPBG is input as an enable (EN) signal to each of bias circuit 110G, comparator 120G, and D flip-flop 125G. Each of bias circuit 110G, comparator 120G, and D flip-flop 125G performs a circuit operation described below when EN signal is at H level. On the other hand, when EN signal is at L level, each of bias circuit 110G, comparator 120G, and D flip-flop 125G comes into a power-off state and stops the circuit operation. In a power-off state, power consumption does not occur except minute leak current generated in a transistor in the off state.

Bias circuit 110G generates bias voltages VING, VREFG, based on voltage AVCC and voltage AGND.

Figure 4:
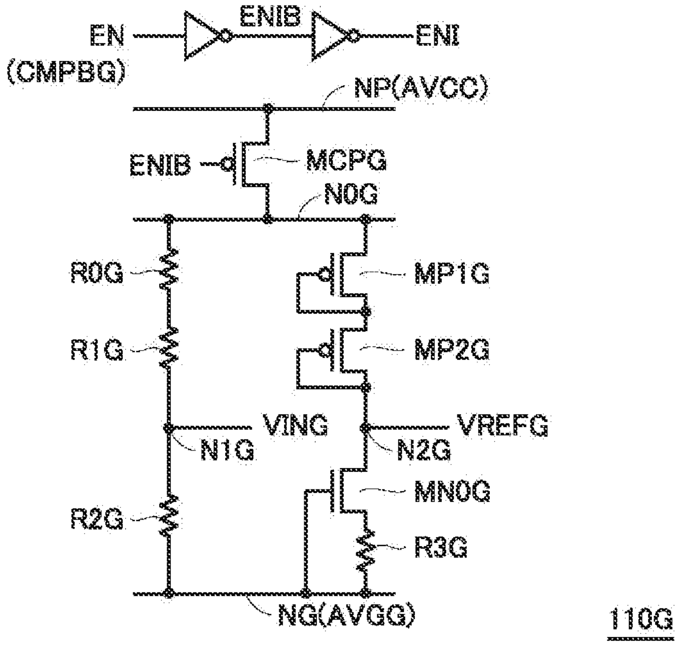
FIG. 4 is a circuit diagram illustrating a configuration example of a bias circuit shown in FIG. 3.
Figure 5:
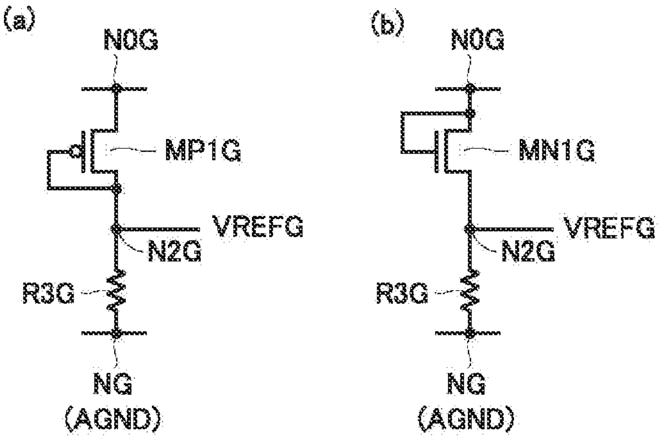
FIG. 5 is a circuit diagram illustrating a modification of the configuration of the bias circuit shown in FIG. 4.

A configuration example of bias circuit 110G and a modification thereof are shown in FIG. 4 and FIG. 5.

In the configuration example in FIG. 4, bias circuit 110G includes resistor elements ROG, R1G, R2G, R3G, P-type transistors MP1G, MP2G, an N-type transistor MNOG, and a P-type transistor MCPG for power-off. In bias circuit 110G, transistor MCPG corresponds to an embodiment of "power-off circuit".

Transistor MCPG is connected between power supply node NP and node NOG. A signal ENIB which is an inversion of disconnection detection signal CMPBG input as EN signal is input to the gate of transistor MCPG. In other words, the logic level of signal ENIB is similar to that of disconnection detection signal CMPG. Transistor MCPG turns on during circuit operation (EN=H level) and turns off in a power-off state (EN=L level). Hereinafter, the operation of bias circuit 110G during circuit operation in which node NOG is connected to power supply node NP will be described.

Resistor elements ROG and RIG are connected in series between node NOG and node N1G at which bias voltage VING is produced. Resistor element R2G is connected between node N1G and GND node NG. Therefore, bias voltage VING is the one obtained by dividing a voltage difference between voltage AVCC and voltage AGND.

Transistors MP1G and MP2G are connected in series between node NOG and node N2G at which bias voltage VREFG is produced, and form a series path together with transistor MNOG and resistor element R3G between power supply node NP and GND node NG. Each of transistors MP1G and MPG2 is diode-connected. Transistor MNOG and resistor element R3G are connected in series between node N2G and GND node NG. Transistor MNOG is configured to have a threshold voltage Vt such that drain current flows when the gate-source voltage is 0 [V]. For example, transistor MNOG can be configured with a native NMOS transistor (or depletion-type NMOS transistor). The gate of transistor MNOG is connected to GND node NG. Thus, transistor MNOG in the on state and resistor element R3G operate as a constant current source connected between node N2G and GND node NG.

Figure 6:
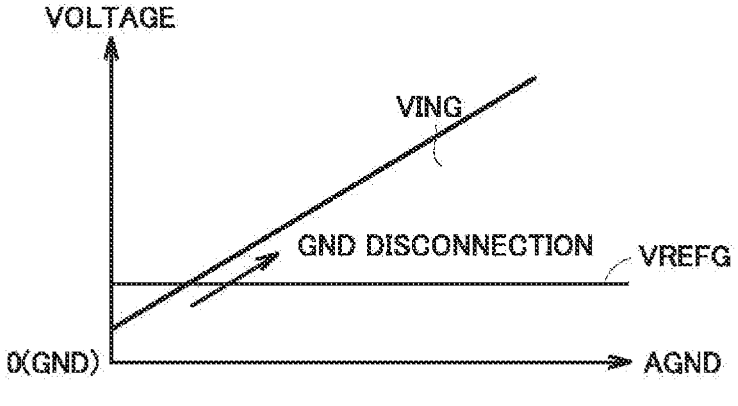
FIG. 6 is a conceptual diagram illustrating the operation of the bias circuit shown in FIG. 3.

FIG. 6 shows a graph conceptually depicting the behavior of bias voltages VING, VREFG for change in voltage AGND, for explaining the operation of bias circuit 110G.

As shown in FIG. 6, bias voltage VING is proportional to a voltage difference between voltage AVCC and voltage AGND. Therefore, when GND disconnection occurs, voltage AVCC is constant, while bias voltage VING increases as voltage AGND increases.

On the other hand, in the series path including node N2G, transistors MP1G and MP2G act as a diode through which constant current by transistor MNOG and resistor element R3G passes, and thus bias voltage VREFG is generated using a forward voltage of the diode with transistors MP1G and MP2G. Therefore, if voltage AVCC does not change, reduction of voltage AGND has little effect on bias voltage VREFG. Thus, bias voltage VREFG is at a substantially constant level for change in voltage AGND and thus does not change much from a normal state (at a time of non-occurrence of GND disconnection) even when voltage AGND increases at a time of occurrence of GND disconnection. In this way, compared with bias voltage VING, bias voltage VREFG has low sensitivity to a voltage change (increase) at GND node NG. In other words, bias voltage VREFG corresponds to an embodiment of "first bias voltage", and bias voltage VING corresponds to an embodiment of "second bias voltage".

Therefore, it is understood that VING<VREFG is attained in a normal state (at a time of non-occurrence of GND disconnection) by appropriately setting the voltage division ratio by resistor elements ROG to R2G, whereas conversely, VING>VREFG is attained when voltage AGND increases due to GND disconnection. In this way, bias circuit 110G operates to generate bias voltages VING, VREFG whose level relation is reversed between in a normal state and at a time of GND disconnection.

The configuration for generating bias voltage VREFG in FIG. 4 may be modified to a configuration shown in FIG. 5. For example, as shown in FIG. 5(*a*), a similar bias voltage VREFG can be generated by a simple configuration with a P-type transistor MP1G (diode-connection) connected between node NOG and node N2G, and a resistor element R3G connected between node N2G and GND node NG.

Alternatively, as shown in FIG. 5(*b*), a similar bias voltage VREFG can be generated by a simple configuration with an N-type transistor MN1G (diode-connection) connected between node NOG and node N2G, and a resistor element R3G connected between node N2G and GND node NG.

In the configuration example in FIG. 4, compared with the modifications in FIGS. 5(*a*) and (*b*), the number of circuit elements is increased, while the independency (low sensitivity) of bias voltage VREFG from change in voltage AGND is improved.

In bias circuit 110G, in a power-off state in which EN=L level, transistor MCPG is turned off, so that node NOG is isolated from power supply node NP. Consequently, a current path between power supply node NP and GND node NG is interrupted inside bias circuit 110G. As a result, current (consumption current) flowing from power supply node NP to GND node NG is fixed to zero, thereby implementing the power-off function of bias circuit 110G.

Referring to FIG. 3 again, bias voltages VING and VREFG generated by bias circuit 110G are respectively input to the (+) input terminal and the (−) input terminal of comparator 120G. Comparator 120G generates an output signal VCMPG having a logic level in accordance with a comparison result of voltages of the (−) input terminal and the (+) input terminal. When a voltage of the (+) input terminal is lower than a voltage of the (−) input terminal, that is, when VING<VREFP, VCMPG=L level is set. Therefore, at a time of non-occurrence of GND disconnection (in a normal state), VCMPG=L level is set.

On the other hand, when a voltage of the (+) input terminal is higher than a voltage of the (−) input terminal, that is, when VING>VREFP, VCMPG=H level is set. Therefore, at a time of GND disconnection, VCMPG=H level is set.

Figure 7:
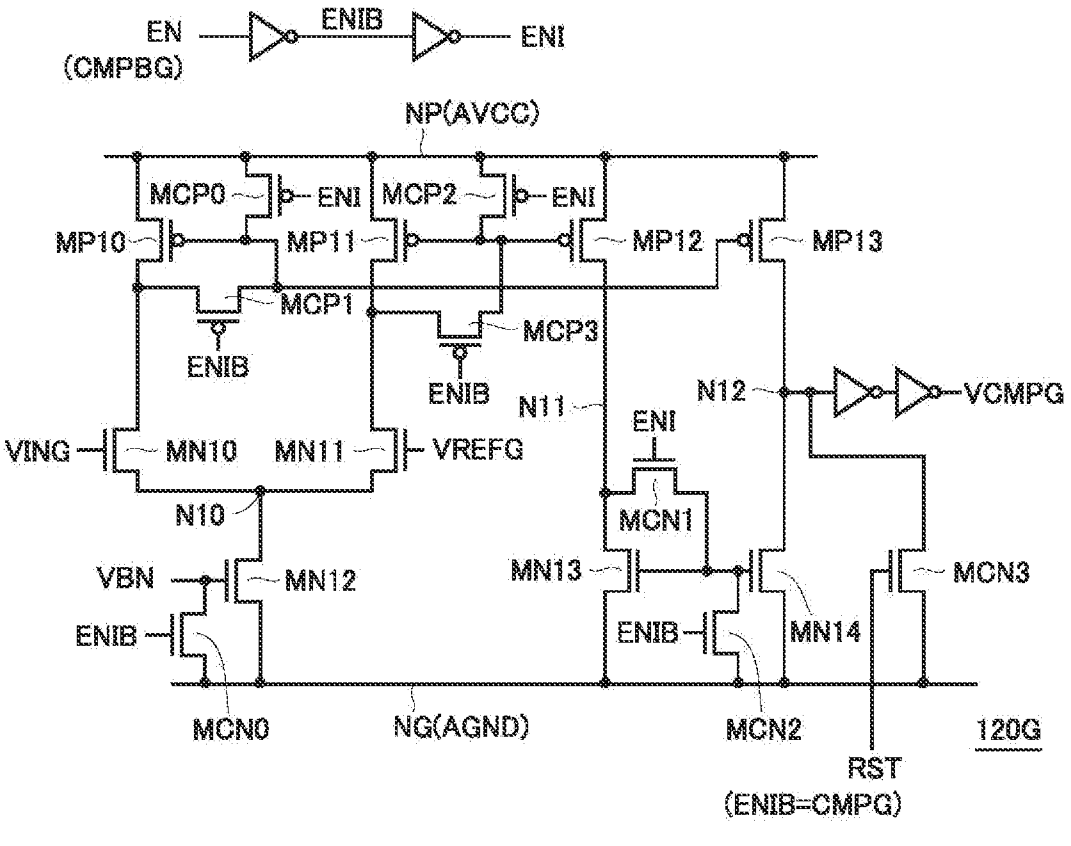
FIG. 7 is a circuit diagram illustrating a configuration example of a comparator shown in FIG. 3.

FIG. 7 shows a circuit diagram illustrating a configuration example of comparator 120G. Comparator 120G also has a power-off function in accordance with EN signal described above.

As shown in FIG. 7, comparator 120G includes P-type transistors MP10 to MP13 and N-type transistors MN10 to MN14 to constitute a two-stage amplifier. Comparator 120G further includes P-type transistors MCP0 to MCP3 and N-type transistors MCN0 to MCN3 for the power-off function. These transistors MCP0 to MCP3, MCN0 to MCN3 constitute an embodiment of "power-off circuit" in comparator 120G.

Transistors MP10 and MN10 are connected in series between power supply node NP and node N10. Transistors MP11 and MN11 are connected in series between power supply node NP and node N10, in parallel with transistors MP10 and MN10. The gate of transistor MN10 corresponds to the (+) input terminal in FIG. 3 and receives bias voltage VING from bias circuit 110G. The gate of transistor MN11 corresponds to the (−) input terminal in FIG. 3 and receives bias voltage VREFG from bias circuit 110G.

Transistor MN12 is connected between node N10 and GND node NG. Transistor MN12 receives a constant bias voltage VBN at the gate and operates as a constant current source.

Transistors MP12 and MN13 are connected in series between power supply node NP and GND node NG through node N11. Transistors MP13 and MN14 are connected in series between power supply node NP and GND node NG through node N12. Transistors MP11 and MP12 have the gates connected to each other to form a current mirror. Similarly, transistors MP10 and MP13 also form a current mirror.

Transistor MN13 is connected between node N11 and GND node NG, and transistor MN14 is connected between node N12 and GND node NG. Transistors MN13 and MN14 have the gates connected to each other to form a current mirror.

The arrangement of transistors related to the power-off function will now be described. P-type transistor MCP0 is connected between power supply node NP and the gates of P-type transistors MP10 and MP13. Similarly, P-type transistor MCP2 is connected between power supply node NP and the gates of P-type transistors MP11 and MP12. ENI with the same logic level as EN signal is input to the gates of transistors MCP0 and MCP2.

N-type transistor MCN0 is connected between GND node NG and the gate of N-type transistor MN12. N-type transistor MCN2 is connected between GND node NG and the gates of N-type transistors MN13 and MN14. ENIB with a logic level opposite to EN signal is input to the gates of transistors MCN0 and MCN2.

P-type transistor MCP1 is connected between the connection point of transistors MP10 and MN10 and the gates of transistors MP10 and MP13. Similarly, P-type transistor MCP3 is connected between the connection point of transistors MP11 and MN11 and the gates of transistors MP11 and MP12. N-type transistor MCN1 is connected between the connection point of transistors MP12 and MN13 and the gates of transistors MN13 and MN14. ENIB is input to the gates of transistors MCP1 and MCP3, and ENIB is input to the gate of transistor MCN2.

Therefore, during circuit operation in which EN=H level (ENI=H level, ENIB=L level), transistors MCP0, MCP2, MCN0, MCN2 turn off and transistors MCP1, MCP3, MCN1 turn on. Thus, the two-stage amplifier composed of P-type transistors MP10 to MP13 and N-type transistors MN10 to MN14 operates.

During operation of the two-stage amplifier, current of transistor MN10 and current of transistor MN11 are those obtained by dividing constant current by transistor MN12 in accordance with the level relation between bias voltages VING and VREFG. Thus, a current difference is produced between current of transistors MP10 and MN10 and current of transistors MP11 and MN11, in accordance with the gate voltage difference of transistors MN10 and MN11.

Since transistors MP10 and MP13, transistors MP11 and MP12, and transistors MN13 and MN14 form respective current mirrors, the current difference of transistors MN10 and MN11 produced by the gate voltage difference of transistors MN10 and MN11 described above is amplified to cause a voltage difference of nodes N11 and N12. As a result, a voltage difference that is the amplified difference between the gate voltage of transistor MN10 (voltage of the (+) input terminal) and the gate voltage of transistor MN11 (voltage of the (−) input terminal) is produced between node N11 and N12.

The voltage of node N12 is amplified by the two-stage (even-numbered stage) inverter and output as a binary output signal VCMPG from comparator 120G. Consequently, in the configuration example in FIG. 7, when VING<VREFG, VCMPG=AGND (L level), whereas when VING>VREFG, VCMPG=AVCC (H level).

N-type transistor MCN3 for reset operation is connected between node N12 and GND node NG. A RST signal is input to the gate of transistor MCN3. As shown in FIG. 3, disconnection detection signal CMPG having a logic level opposite to that of disconnection detection signal CMPBG input as EN signal can be used as reset signal RST. Alternatively, EMIB may be input to the gate of transistor MCN3, in common to transistors MCN0, MCN2. Since transistor MCN3 is turned off during circuit operation (EM=H level), a voltage that is the amplified voltage difference of bias voltages VING and VREFG described above appears at node N12.

On the other hand, during power-off in which EN=L level (ENI=L level, ENIB=H level), transistors MCP0, MCP2, MCN0, MCN2 turn on and transistors MCP1, MCP3, MCN1 turn off. As a result, voltage AVCC is input to the gates of P-type transistors MP10 to MP13, and voltage AGND is input to the gates of N-type transistors MN12 to MN14.

Consequently, P-type transistors MP10 to MP13 and N-type transistors MN12 to MN14 are turned off. As a result, the circuit operation of the two-stage amplifier is stopped, and the current path between power supply node NP and GND node NG is interrupted inside comparator 120G. In this way, current (consumption current) flowing from power supply node NP to GND node NG is fixed to zero, thereby implementing the power-off function of comparator 120G. In the power-off circuit in FIG. 7, a transistor through which current always flows during circuit operation is not added for current interruption, thereby preventing increase in power consumption during circuit operation for the power-off function.

During power-off (ENIB-H level), transistor MCN3 turns on and node N12 is connected to GND node NG. Consequently, output signal VCMPG is reset to L level.

Referring to FIG. 3 again, output signal VCMPG of comparator 120G is input to D flip-flop 125G. D flip-flop 125G operates when EN signal=H level and stops into a power-off state when EN signal=L level. An output signal (OUT) of D flip-flop 125G serves as disconnection detection signal CMPG. An inversion output signal (OUTB) of D flip-flop 125G serves as disconnection detection signal CMPBG having a logic level opposite to that of disconnection detection signal CMPG.

In response to input of reset signal FRST, D flip-flop 125G initializes disconnection detection signal CMPG to L level (CMPBG=H level). For example, reset signal FRST can be input at start-up of semiconductor device 100A.

If GND disconnection does not occur at start-up of semiconductor device 100A, VING<VREFG in bias circuit 110G and therefore output signal VCMPG of comparator 120G is at L level, and VCMPG=L level is kept as long as GND disconnection does not occur.

Therefore, in D flip-flop 125G, while an input signal (IN) is kept at L level after the initialization, disconnection detection signal CMPG is kept at L level (CMPBG=H level).

On the other hand, when GND disconnection occurs to cause change to VING>VREFG in bias circuit 110G, disconnection detection signal CMPG changes from L level to H level in response to output signal VCMPG of comparator 120G, that is, an input signal (IN) of D flip-flop 125G changing from L level to H level. Conversely, disconnection detection signal CMPBG changes from H level to L level.

In this way, in a normal state, disconnection detection circuit 105G sets disconnection detection signal CMPG=L level (CMPBG=H level). EN signal to bias circuit 110G, comparator 120G, and D flip-flop 125G is set to H level (circuit operating state). On the other hand, at a time of GND disconnection, disconnection detection circuit 105G sets disconnection detection signal CMPG=H level (CMPBG=L level). EN signal to bias circuit 110G, comparator 120G, and D flip-flop 125G is set to L level (power-off state).

Delay circuit 130G generates delay signals CMPGD and CMPBGD by delaying disconnection detection signals CMPG and CMPBG, respectively, from disconnection detection circuit 105G.

Figure 8:
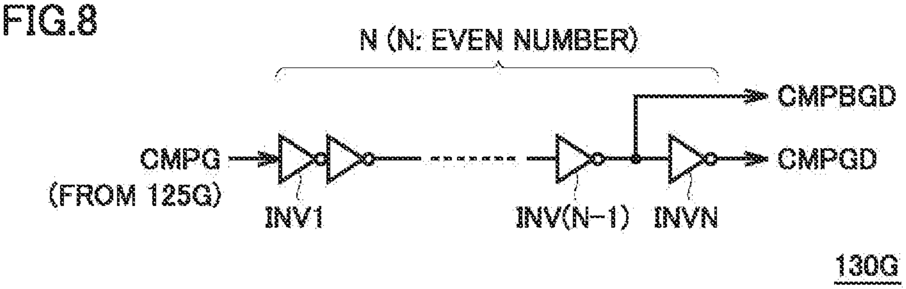
FIG. 8 is a circuit diagram illustrating a configuration example of a delay circuit shown in FIG. 3.

FIG. 8 shows a configuration example of delay circuit 130G.

As shown in FIG. 8, delay circuit 130G can be configured with N (where N is an even number equal to or larger than 2) inverters INV1 to INVN connected in series. Inverter INV1 at the first stage receives disconnection detection signal CMPG from D flip-flop 125G, and inverter INVN at the last stage outputs delay signal CMPGD of disconnection detection signal CMPG.

Delay time Td applied by delay circuit 130G can be adjusted by the number of inverters (N). Delay signal CMPBGD of disconnection detection signal CMPBG may be output from inverter INV(N−1) one stage before the last stage. Alternatively, in order to accurately match the delay time, N inverters for generating delay signal CMPBGD may be provided separately from inverters INV1 to INVN in FIG. 8.

Figure 9:
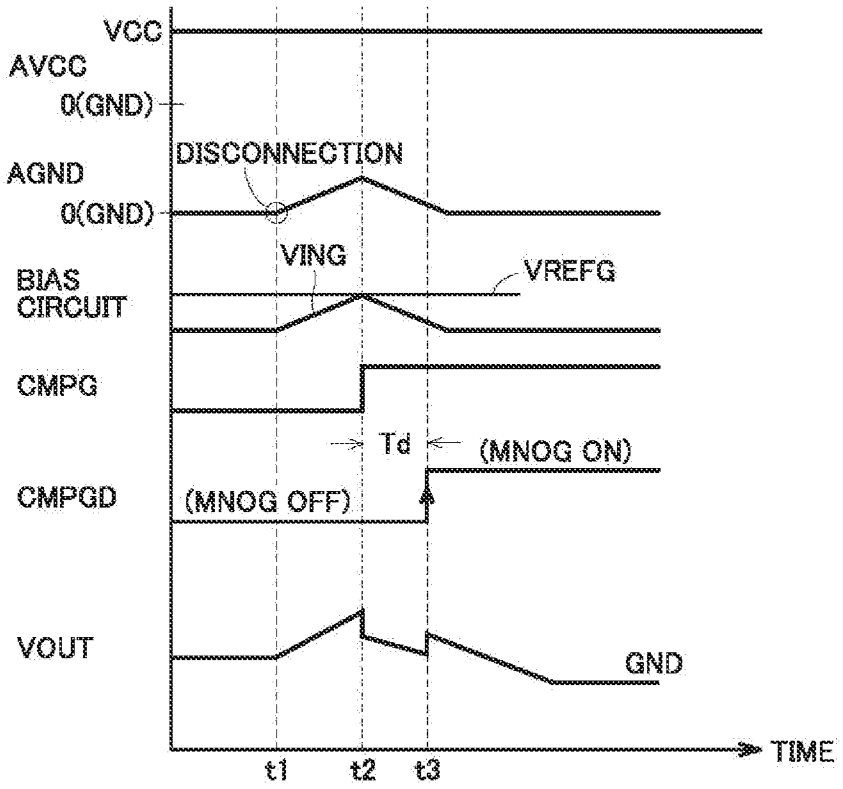
FIG. 9 is an operation waveform diagram of the semiconductor device according to the first embodiment.

Referring now to FIG. 9 and FIG. 3, the operation of semiconductor device 100A according to the first embodiment at a time of GND disconnection will be described.

As shown in FIG. 9, before GND disconnection occurs at time t1, AGCC=VCC and AGND=GND are stable. In such a normal state, as VING<VREFG in bias circuit 110G, disconnection detection signal CMPG is at L level. Thus, as shown in FIG. 3, EN signal (disconnection detection signal CMPBG) is set to H level and a circuit operation is performed in each of bias circuit 110G, comparator 120G, and D flip-flop 125G.

In operational amplifier circuit 150, transistors MPC1, MNC1 are turned off and transistors MPC2, MNC2 are turned on in output transistor control circuits 180P, 180N. As a result, operational amplifier circuit 150 performs a normal circuit operation in which output voltage VOUT is output in accordance with an input voltage to inversion output node No1 (− side) and non-inversion output node No2 (+ side) of differential amplifier 160.

As shown in FIG. 9, when GND disconnection occurs at time t1, voltage AGND of GND node NG is not fixed to ground voltage GND and gradually increases. FIG. 9 illustrates a waveform of AGND increasing immediately after time t1, for convenience of illustration, but actually, voltage AGND may be ground voltage GND immediately after occurrence of GND disconnection.

In response to increase of voltage AGND, bias voltage VREFG does not change and bias voltage VING increases in bias circuit 110G. As a result, in the operation example in FIG. 9, at time t2, bias voltage VING becomes higher than bias voltage VREFG. In response, disconnection detection signal CMPG changes from L level to H level. Conversely, disconnection detection signal CMPBG used as EN signal changes from H level to L level. In response, the control operation for handling GND disconnection is started in semiconductor device 100A.

Referring to FIG. 3 again, conversely to a normal state, transistors MPC2, MNC2 are turned off and transistors MPC1, MNC1 are turned on in output transistor control circuits 180P, 180N in operational amplifier circuit 150. As a result, each of output transistors MPOUT and MNOUT attains the same potential at the gate and the source and is then turned off.

Further, in response to disconnection detection signal CMPG changing to H level (CMPBG at L level), semiconductor device 100A transitions to a power-off state. In a power-off state, EN=L level is set, and bias circuit 110G, comparator 120G, and D flip-flop 125G in FIG. 3 are brought into a power-off state, so that current generated between power supply node NP and GND node NG is interrupted.

As shown in FIG. 9, due to this current interruption effect, after time t2, when GND disconnection is occurring, current flowing into GND node NG is interrupted and thereby voltage AGND decreases and output voltage VOUT also decreases. Since increase of voltage AGND is avoided, occurrence of abnormal current Iabn1 described in FIG. 2 can be prevented.

At time t3 when delay time Td by delay circuit 130G has passed since time t2, delay signal CMPGD output by delay circuit 130G changes from L level to H level. As shown in FIG. 3, at time t3 later than time t2, in response to delay signal CMPGD being set to H level, pull-down transistor MNOG is turned on. As a result, GND node NG having GND disconnection can be electrically connected to reference voltage node 11, outside semiconductor device 100A, via output node No and output terminal 103. In other words, pull-down transistor MNOG can constitute an embodiment of "pull-down circuit".

Consequently, after time t3, since GND node NG and output terminal 103 are pulled down, stabilization (VOUT=GND) can be further achieved after decreasing the voltage of output terminal 103. Further, since voltage AGND of GND node NG having disconnection is fixed to ground voltage GND, the effect of preventing occurrence of abnormal current Iabn1 can be further enhanced after time t3.

On the other hand, at time t3, if current is produced at output node No or GND node NG, turning on of pull-down transistor MNOG causes the current to be led to a short-circuit loop path including output transistor MNOUT and pull-down transistor MNOG connected in parallel.

Therefore, after semiconductor device 100A transitions to a power-off state at time t2, it is necessary to decrease current sufficiently to substantially zero and then turn on pull-down transistor MNOG. In other words, delay time Td between time t2 and t3 is set corresponding to the time required for current to sufficiently decrease after a power-off state is set. For example, delay time Td can be preset based on the result of actual device test or the like.

Consequently, in the semiconductor device according to the first embodiment, in response to detection of GND disconnection at time t2 in FIG. 9, output transistor MNOUT is forcibly turned off and semiconductor device 100A transitions to a power-off state to avoid increase of voltage AGND, thereby preventing occurrence of abnormal current Iabn1 (FIG. 2) resulting from GND disconnection.

Further, pull-down transistor MNOG is turned on after current flowing into GND node NG sufficiently decreases after a delay from turning off of output transistor MNOUT, thereby stabilizing voltage of output terminal 103 (VOUT=GND).

The power-off state of semiconductor device 100A and the current conditions at a time when pull-down transistor MNOG is on will be further described below.

Figure 10:
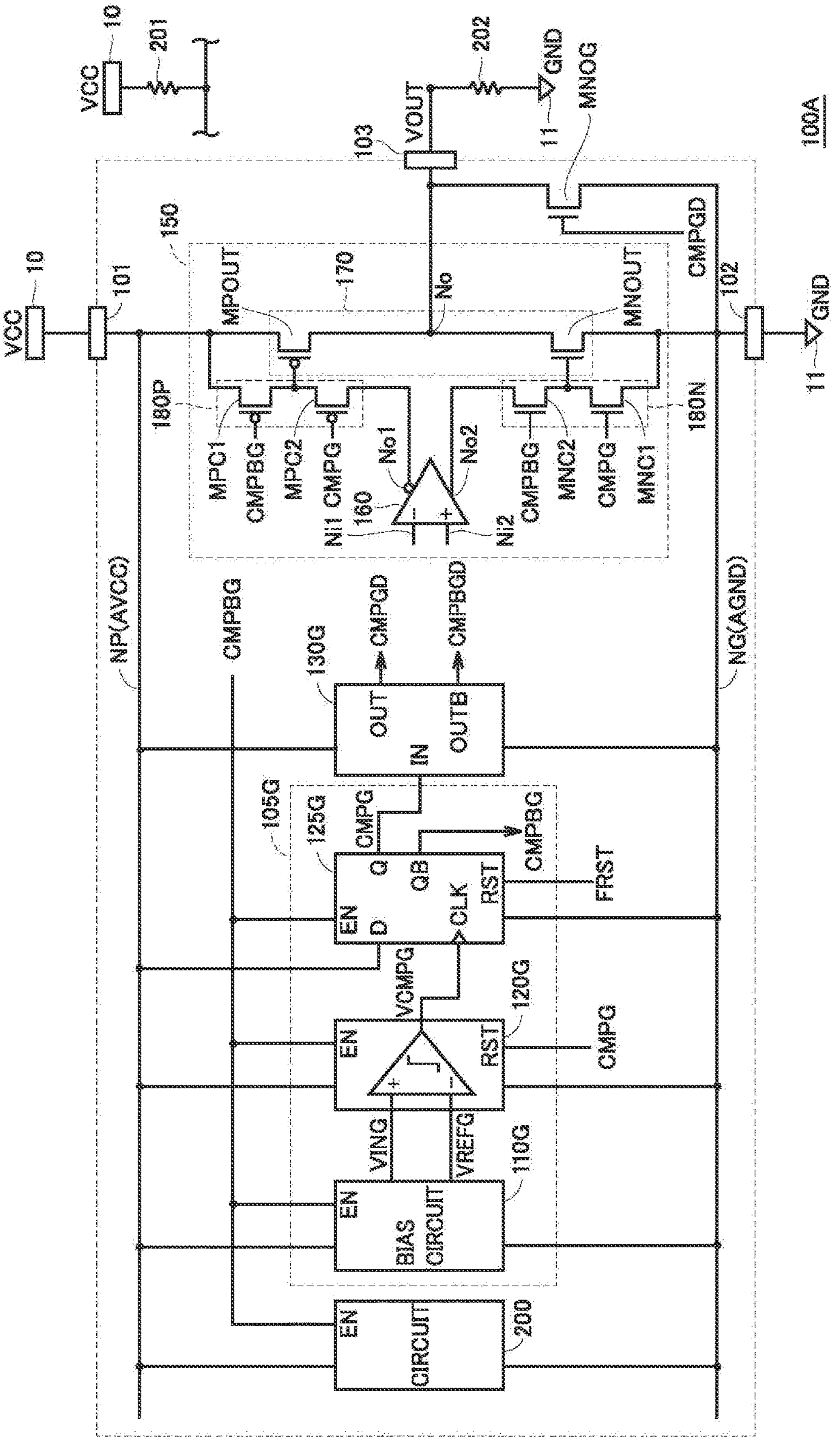
FIG. 10 is a block diagram illustrating a modification of the configuration of the semiconductor device shown in FIG. 3.

FIG. 10 shows a configuration as a modification of semiconductor device 100A in which a circuit 200 other than the elements in FIG. 3 is provided.

In the configuration example in FIG. 10, circuit 200 connected between power supply node NP and GND node NG is further arranged in addition to disconnection detection circuit 105G and operational amplifier circuit 150 shown in FIG. 3. Circuit 200 has a power-off function in accordance with EN signal common to bias circuit 110G, comparator 120G, and D flip-flop 125G.

Figure 11:
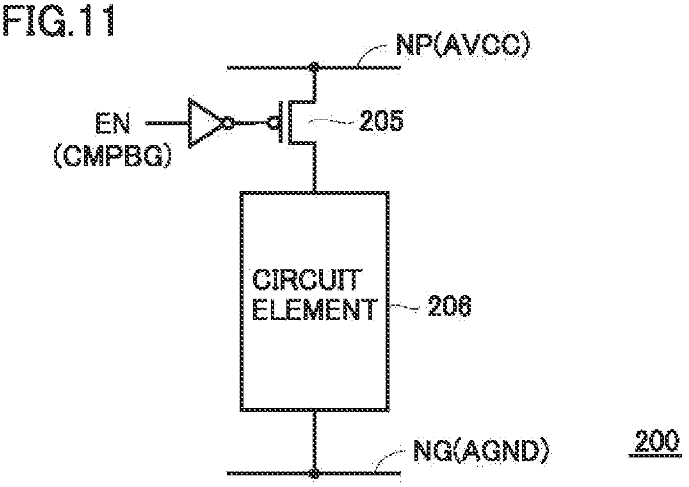
FIG. 11 is a block diagram illustrating a power-off function of a circuit added in FIG. 10.

FIG. 11 shows a block diagram for explaining the power-off function of circuit 200.

As shown in FIG. 11, circuit 200 shown in FIG. 10 includes a cut-off transistor 205 and a circuit element 206 connected between power supply node NP and GND node NG. Cut-off transistor 205 is composed of, for example, a P-type transistor and receives an inversion signal of EN signal at the gate.

Cut-off transistor 205 is connected in series with circuit element 206, and cut-off transistor 205 turns off to interrupt the current path between power supply node NP and GND node NG via circuit element 206.

In a normal state in which disconnection detection signal CMPG is kept at L level (disconnection detection signal CMPBG is at H level), cut-off transistor 205 turns on to supply current to circuit element 206, so that circuit 200 can perform a desired circuit operation.

On the other hand, at a time of GND disconnection, in response to disconnection detection signal CMPG changing to H level (disconnection detection signal CMPBG is at L level), cut-off transistor 205 is turned off. As a result, circuit 200 is brought into a power-off state and can interrupt current flowing from power supply node NP to GND node NG through circuit element 206. As a result, increase of voltage AGND at a time of GND disconnection due to circuit 200 can be prevented. In other words, in circuit 200, cut-off transistor 205 corresponds to an embodiment of "power-off circuit".

Alternatively, in circuit 200, each transistor connected between power supply node NP and GND node NG may be forcibly turned off by a circuit that connects the gate of the transistor to power supply node NP or GND node NG in accordance with disconnection detection signals CMPG, CMPBG, thereby implementing a power-off function, in the same manner as in comparator 120G described in FIG. 7. Circuit 200 corresponds to an embodiment of "second circuit".

In the configuration example in FIG. 3, operational amplifier circuit 150 has output transistors MPOUT, MNOUT provided with the off function in accordance with disconnection detection signals CMPG, CMPBG. Although the power-off function of differential amplifier 160 is not mentioned, not-shown a plurality of transistors that constitute differential amplifier 160 may be forcibly turned off in accordance with disconnection detection signals CMPG, CMPBG with a configuration similar to that in FIG. 7 to implement "power-off circuit".

The power-off state of semiconductor device 100A does not necessarily require that the above power-off function should be provided in all circuits.

Figure 12:
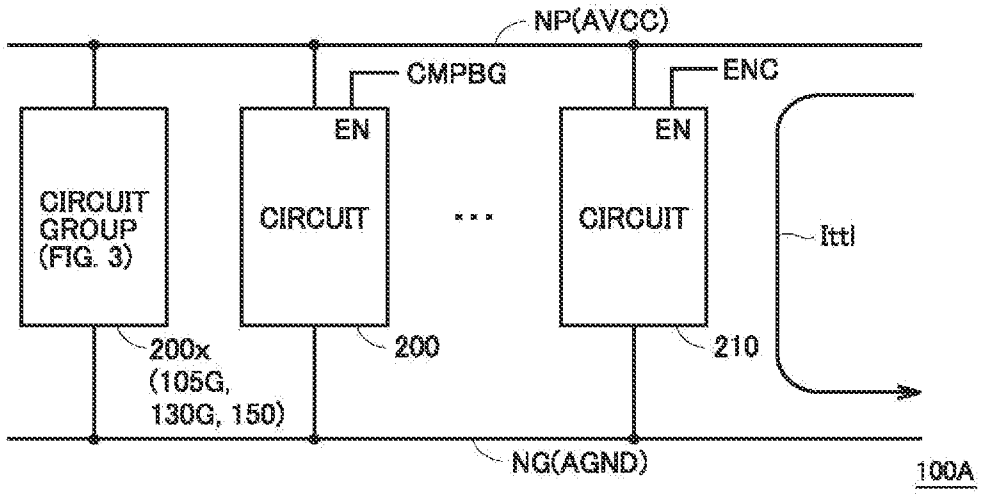
FIG. 12 is a block diagram illustrating another modification of the configuration of the semiconductor device shown in FIG. 3.

For example, as shown in FIG. 12, semiconductor device 100A can include a circuit group 200*x* (105G, 130G, 150) shown in FIG. 3 and at least one circuit 200 (FIG. 11) having a power-off function, and at least one circuit 210 not having a power-off function.

Circuit 210 receives, as EN signal, a signal ENC not affected by disconnection detection signals CMPG, CMPBG. Alternatively, EN signal is not necessarily input to circuit 210. Therefore, in circuit 210, both in a normal state and at a time of GND disconnection, current is produced in accordance with a circuit operation but the current is relatively small.

For example, since current flowing through output transistors MNOUT, MPOUT is dominant in operational amplifier circuit 150 as described above, it is an option not to arrange a power-off function in differential amplifier 160.

In this way, when a circuit group in a power-off state at a time of occurrence of GND disconnection and a circuit group (201) having no power-off function and generating current flowing to GND node NG are mixed, a total current value Itt1 in semiconductor device 100A, that is, in the entire IC that flows between power supply node NP and GND node NG at a time of GND disconnection decreases to such a current level that a current path via body diode Dn of output transistor MNOUT is not formed, thereby preventing occurrence of abnormal current Ibn1 (FIG. 2). In other words, a power-off state of semiconductor device 100A can be defined as a state in which total current value Itt1 in a power-off state is lower than a limit current value Ilmt set corresponding to the above current level. In other words, a power-off state of semiconductor device 100A can be defined by determining a circuit having a power-off function such that total current value Itt1 is lower than limit current value Ilmt.

Figure 13:
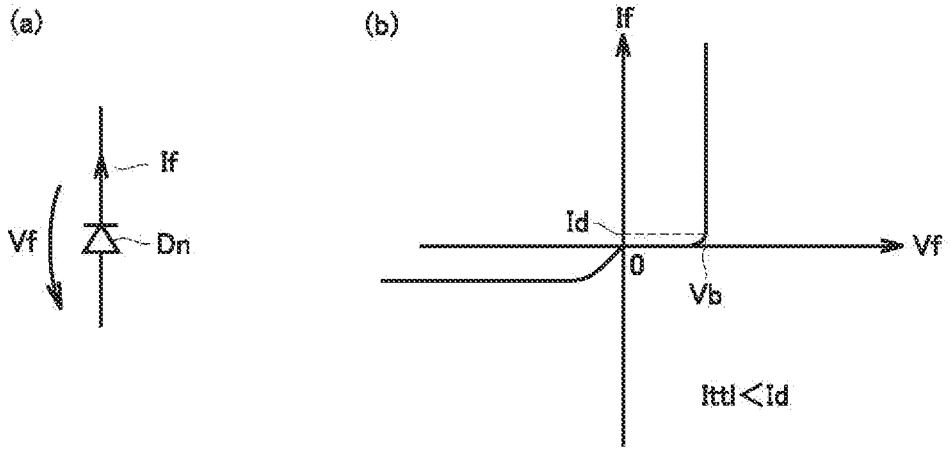
FIG. 13 is a conceptual diagram for explaining the voltage-current characteristic of a diode.

This limit current value Ilmt can be determined in advance, for example, in accordance with the characteristics of the body diode of the output transistor shown in FIG. 13.

FIG. 13 shows the voltage-current characteristic of the body diode of output transistor MNOUT. Voltage Vf of the anode to the cathode and forward current If of body diode Dn are defined as shown in FIG. 13(*a*).

In the voltage-current characteristic (Vf-If characteristic) of body diode Dn shown in FIG. 13(*b*), it is understood that forward voltage Vb (Vb>0) is produced in body diode Dn, that is, body diode Dn is conducting, in the region of If≥Id. Therefore, at a time of occurrence of GND disconnection, it is necessary that total current value Itt1 flowing into GND node NG in the entire semiconductor device 100A should be set to a current level that does not produce a forward voltage in body diode Dn. In other words, it is necessary that total current value Itt1 should be lower than the above current value Id, that is, a lower limit current value that produces a forward voltage in body diode Dn.

Therefore, as long as total current value Itt1 when semiconductor device 100A transitions to a power-off state in response to detection of GND disconnection is lower than limit current value Ilmt set lower than the above lower limit current value Id, it is not necessary to set all in the circuit group connected between power supply terminal 101 and ground terminal 102 inside semiconductor device 100A to a power-off state. In other words, the power-off state of semiconductor device 100A is equivalent to that at least one or some of a plurality of circuits connected between power supply node NP and GND node NG are provided with a power-off function responsive to detection of GND disconnection so that total current value Itt1 is lower than the above limit current value Ilmt. In which circuit of the above circuit group should be provided with a power-off function in order to implement the power-off state of semiconductor device 100A can be determined, for example, by current value measurement in an implementation test. Delay time Td by delay circuit 130G can also be preset in accordance with the time taken for total current value Itt1 to settle to the original level lower than the limit current value Ilmt since a power-off state is started at time t2 in FIG. 9.

Modification of First Embodiment

In the semiconductor device, connecting to power supply 10 at power-on causes voltage AVCC of power supply node NP to rise. Therefore, at power-on, reversion of bias voltages VING and VREFG as explained in FIG. 6 may occur in a period until voltage AVCC rises, causing false detection of GND disconnection. In a modification of the first embodiment, a configuration for suppressing false detection of disconnection at power-on, that is, at start-up of semiconductor device 100A will be described.

Figure 14:
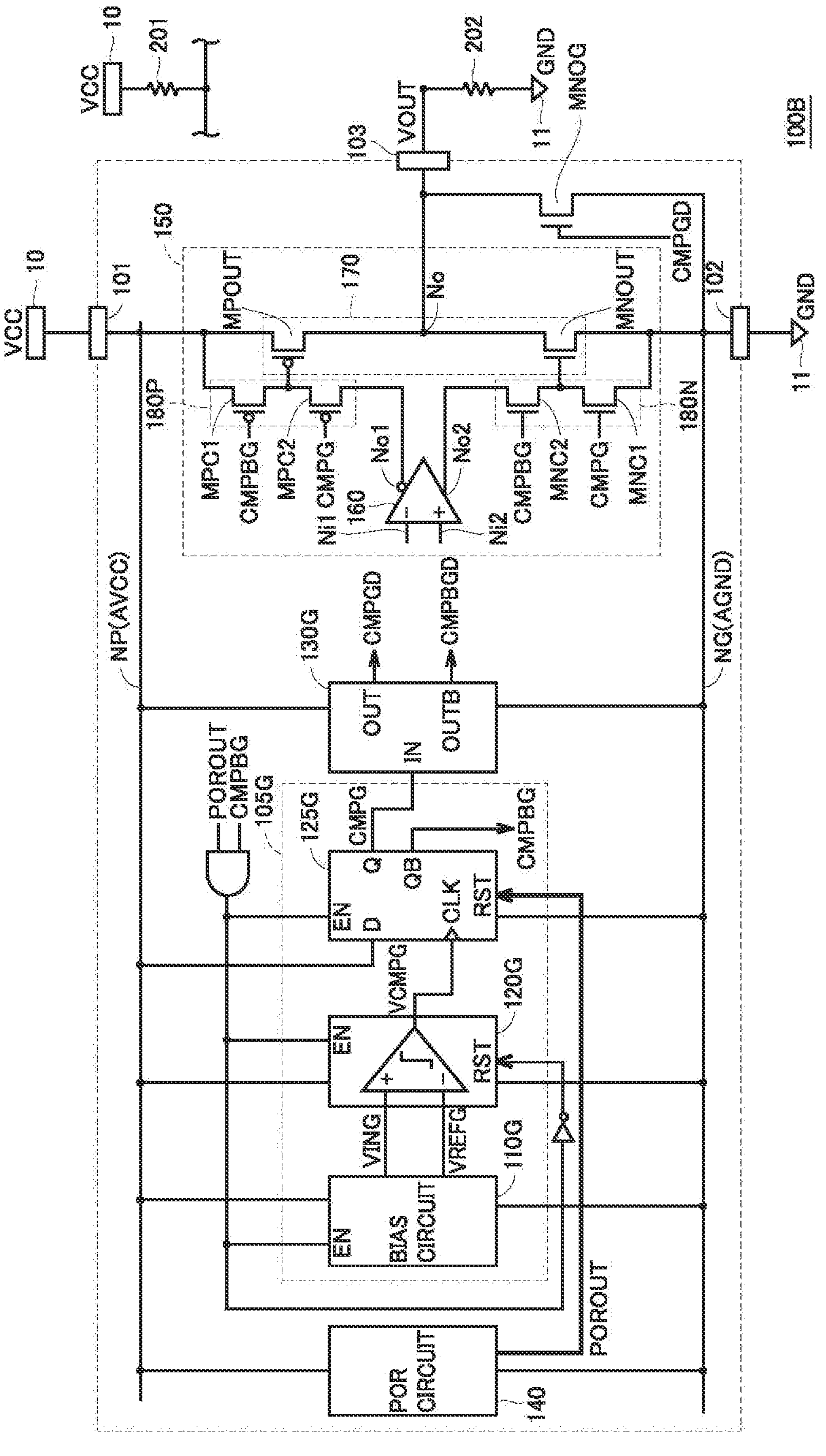
FIG. 14 is a block diagram illustrating a configuration of a semiconductor device according to a modification of the first embodiment.

FIG. 14 is a block diagram illustrating a configuration of a semiconductor device 100B according to a modification of the first embodiment.

As shown in FIG. 14, semiconductor device 100B according to a modification of the first embodiment differs from the configuration of semiconductor device 100A described in the first embodiment in that it further includes a POR (power-on reset) circuit 140.

POR circuit 140 generates a POROUT signal in accordance with voltage VACC of power supply node NP. POROUT signal has an initial value at power-on at L level and changes from L level to H level when voltage AVCC becomes higher than a predetermined voltage.

Figure 15:
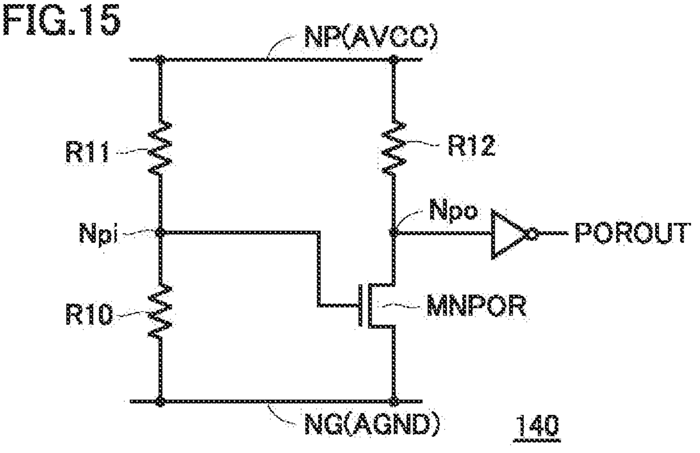
FIG. 15 is a circuit diagram illustrating a configuration example of a power-on reset (POR) circuit in FIG. 14.

FIG. 15 shows a configuration example of POR circuit 140 in FIG. 14.

As shown in FIG. 15, POR circuit 140 includes resistor elements R10 to R12 and an N-type transistor MNPOR. Resistor elements R10 and R11 are connected in series between power supply node NP and GND node NG through node Npi. Therefore, a voltage obtained by dividing a voltage difference between voltage AVCC of power supply node NP and voltage AGND of GND node NG occurs at node Npi.

Resistor element R12 is connected between power supply node NP and node Npo, and N-type transistor MNPOR is connected between node Npo and GND node NG. The gate of transistor MNPOR is connected to node Npi.

Immediately after start-up of semiconductor device 100A, AVCC and AGND have the same level, and subsequently, in response to voltage AVCC rising to power supply voltage VCC of power supply 10, the voltage of node Npi also increases. Thus, before rising of voltage AVCC, that is, in a period in which the voltage of node Npi is lower than the threshold voltage of transistor MNPOR, transistor MNPOR is turned off, so that the voltage of power supply node NP is transmitted to node Npo.

On the other hand, when voltage AVCC rises and the voltage of node Npi becomes higher than the threshold voltage of transistor MNPOR, transistor MNPOR is turned on, so that the voltage of GND node NG is transmitted to node Npo.

An output of the inverter receiving the voltage of node Npo is output as POROUT signal from POR circuit 140. By setting the voltage division ratio of resistor elements R10 and R11 as appropriate, POROUT signal is set to L level until voltage AVCC rises and kept at H level after voltage AVCC rises.

In POR circuit 140, the sum of electrical resistances of resistor elements R10 and R11 is increased so that current flowing between power supply node NP and GND node NG is sufficiently suppressed. Therefore, POR circuit 140 can be configured without the power-off function described in the first embodiment.

Referring to FIG. 14 again, in semiconductor device 100B, EN signal input to bias circuit 110G, comparator 120G, and D flip-flop 125G is generated by AND (logical conjugation) of disconnection detection signal CMPBG similar to that in the first embodiment and POROUT signal. Also in semiconductor device 100B, circuit 200 (with a power-off function) receiving EN signal as explained in FIG. 10 and FIG. 11 may be further arranged.

Therefore, in a modification of the first embodiment, EN signal=L level is kept in a period of POROUT=L level, that is, until voltage AVCC rises at power-on. Consequently, bias circuit 110G, comparator 120G, and D flip-flop 125G do not start operation. POROUT signal can be applied to reset signal RST of D flip-flop 125G.

Consequently, in a period of POTOUT=L level, that is, in a period until voltage AVCC rises at power-on, the operation of disconnection detection circuit 105G is waited equivalently, thereby preventing disconnection detection signals CMPG and CMPGB from changing from the respective initial values, L level and H level.

After rising of voltage AVCC, POROUT signal is kept at H level, and therefore EN signal has the same logic level as disconnection detection signal CMPBG changing from H level to L level at a time of GND disconnection, in the same manner as in the first embodiment. Therefore, semiconductor device 100B can operate in the same manner as 100A according to the first embodiment.

In this way, the semiconductor device according to a modification of the first embodiment can prevent false detection of GND disconnection at power-on and stabilize the operation at start-up, in addition to the effect in the first embodiment.

Second Embodiment

In a second embodiment, a circuit configuration for handling disconnection related to a power supply line in a semiconductor device will be described.

(Abnormal Current Due to Disconnection Related to Power Supply Line)

First of all, referring to FIG. 16 and FIG. 17, abnormal current will be described in a case where disconnection occurs in a power supply line inside a semiconductor device in a configuration in which an output terminal of the semiconductor device is pulled up outside the semiconductor device.

Figure 16:
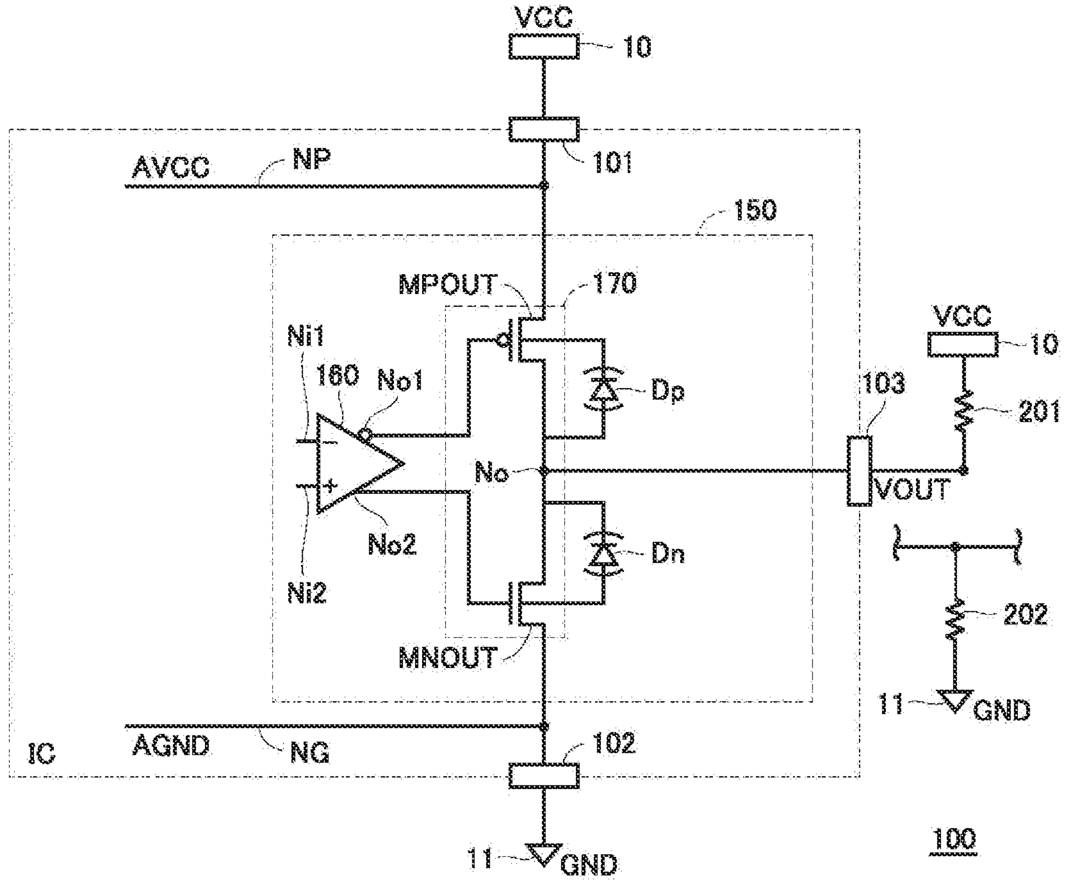
FIG. 16 is a circuit diagram schematically illustrating a configuration of a semiconductor device according to a comparative example in which an output terminal is pulled up.

FIG. 16 shows a circuit diagram schematically illustrating a configuration of semiconductor device 100 according to a comparative example, similar to that in FIG. 1.

Semiconductor device 100 includes a power supply terminal 101, a ground terminal 102, an output terminal 103, a power supply node NP, a GND node NG, and an operational amplifier circuit 150, as explained in FIG. 1. FIG. 16 differs from FIG. 1 in that output terminal 103 is electrically connected to a power supply 10 through a pull-up resistor 201, outside the semiconductor device.

Figure 17:
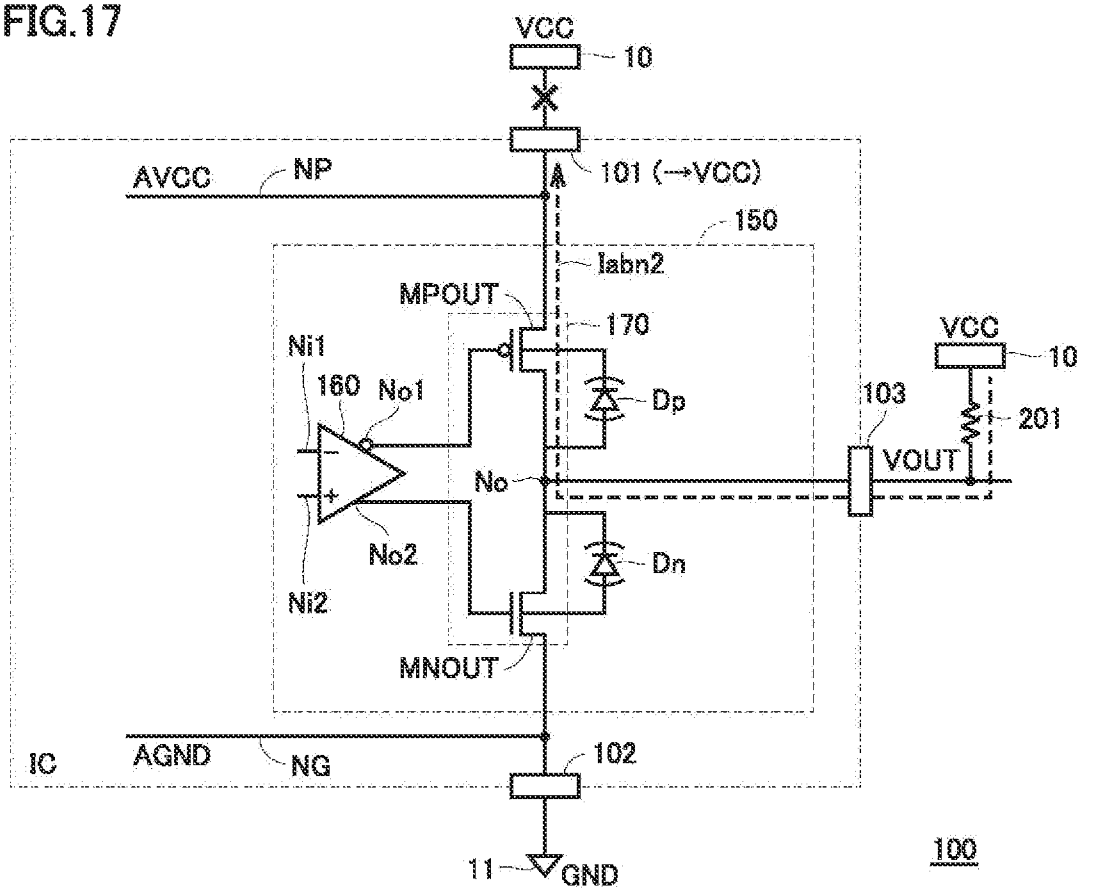
FIG. 17 is a circuit diagram at a time of disconnection on the ground line side of the semiconductor device shown in FIG. 16.

FIG. 17 shows a circuit diagram at a time when disconnection occurs on the power supply line side of semiconductor device 100 shown in FIG. 16 (hereinafter also referred to as at a time of VCC disconnection). Referring to FIG. 17, the operation of semiconductor device 100 when power supply voltage VCC is not supplied will be described.

As shown in FIG. 17, when disconnection occurs between power supply 10 and power supply terminal 101, power supply terminal 101 is opened and power supply node NP is brought into a high impedance (Hi-Z) state. As a result, semiconductor device 100 is provided only with ground voltage GND, and voltage AVCC at power supply node NP gradually decreases over time and ultimately converges to GND (0 [V]).

As explained in the first embodiment, body diodes Dp and Dn respectively formed for output transistors MPOUT (P type) and MNOUT that constitute output stage 170 are reverse-biased in a normal state.

However, at a time of VCC disconnection, voltage AVCC of power supply node NP decreases so that body diode Dp of output transistor MPOUT may be conducting. Therefore, when pull-up resistor 201 is connected to output terminal 103 outside semiconductor device 100, abnormal current Iabn2 shown by a dotted line in the figure may continuously occur through pull-up resistor 201, in a path of power supply 10 (VCC)—pull-up resistor 201—output terminal 103—output node No-body diode Dp of output transistor MPOUT—power supply node NP (voltage decrease).

(Prevention of Abnormal Current at VCC Disconnection According to Second Embodiment)

Figure 18:
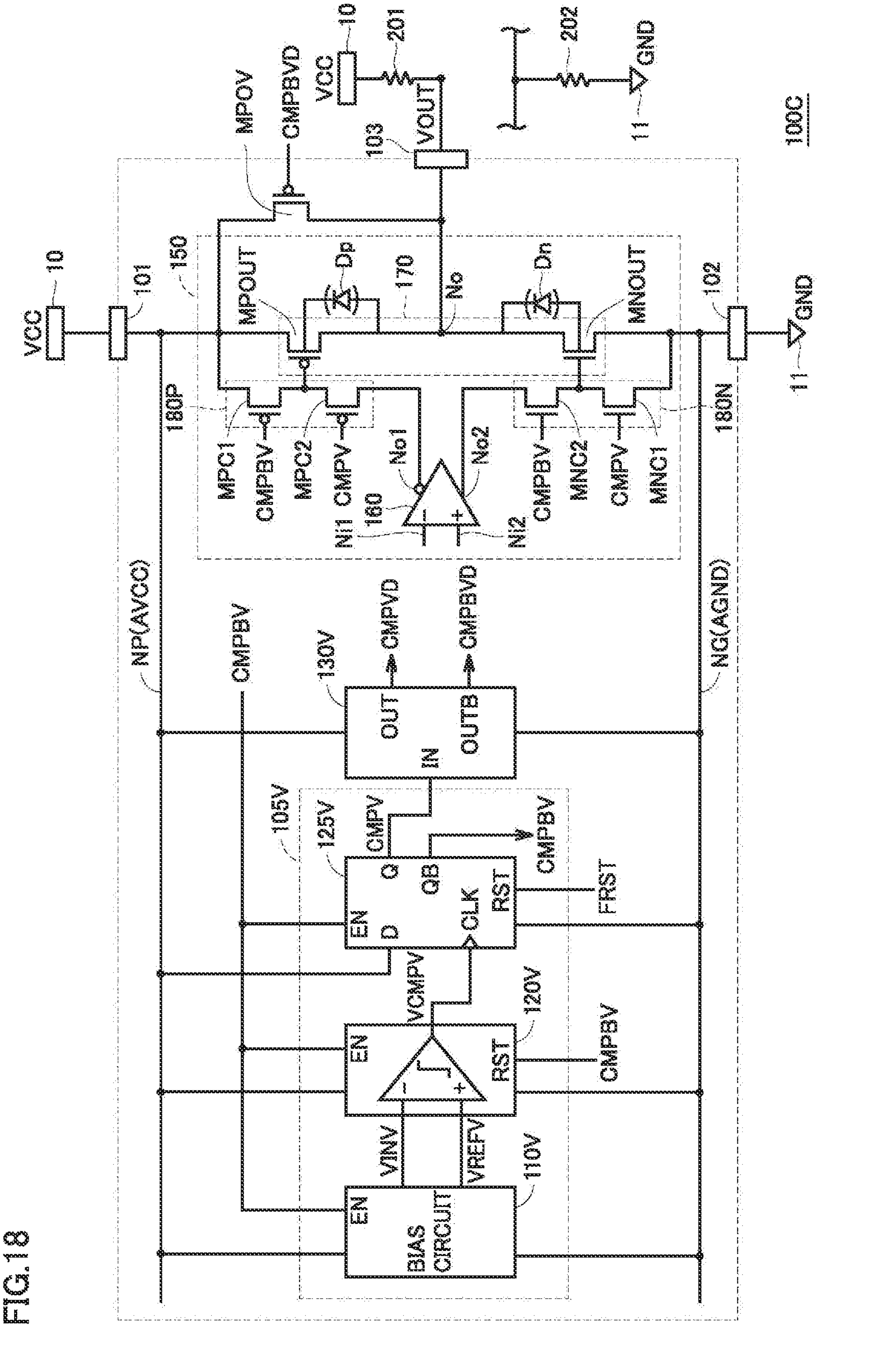
FIG. 18 is a block diagram illustrating a configuration of a semiconductor device according to a second embodiment.

FIG. 18 shows a block diagram illustrating a configuration of a semiconductor device 100C according to the second embodiment.

As shown in FIG. 18, semiconductor device 100C according to the second embodiment further includes, in addition to the configuration of semiconductor device 100 shown in FIG. 16, a disconnection detection circuit 105V, a delay circuit 130V, output transistor control circuits 180P, 180N, and a pull-up transistor MPOV, as a configuration for preventing abnormal current at a time of VCC disconnection.

Output transistor control circuits 180P and 180N include P-type transistors MPC1, MPC2 and N-type transistors MNC1, MMC2, respectively, connected to output transistors MPOUT, MNOUT, in the same manner as in FIG. 3 (semiconductor device 100A).

Pull-up transistor MPOV is connected between output node No connected to output terminal 103, and power supply node NP. In other words, pull-up transistor MPOV is connected between output node No and power supply node NP in parallel with output transistor MPOUT.

Disconnection detection circuit 105V generates disconnection detection signals CMPV and CMPBV, based on voltage AVCC of power supply node NP and voltage AGND of GND node NG. As will be clear from the following description, disconnection detection signal CMPV is initialized to L level and thereafter kept at L level in a normal state in which VCC disconnection does not occur. On the other hand, when VCC disconnection occurs, disconnection detection signal CMPV changes from L level to H level. Disconnection detection signal CMPBV is an inversion signal of disconnection detection signal CMPV, and kept at H level in a normal state and kept at L level when VCC disconnection occurs.

Disconnection detection signal CMPV is input to the gates of transistors MPC2, MNC1 of output transistor control circuits 180P, 180N. Disconnection detection signal CMPBV is input to the gates of transistors MPC1, MNC2 of output transistor control circuits 180P, 180N. In output transistor control circuits 180P, 180N, the pair of transistors MPC1 and MNC1 and the pair of transistors MPC2 and MNC2 are complementarily turned on/off, in the same manner as in the first embodiment.

Delay circuit 130V generates delay signals CMPVD and CMPBVD in which disconnection detection signals CMPV and CMPBV are delayed, respectively, in accordance with a predetermined delay time Td. Delay signal CMPBVD is input to the gate of pull-up transistor MPOV.

Referring to FIG. 18 as well as FIG. 19 to FIG. 23, a configuration of disconnection detection circuit 105V will now be described in detail. Disconnection detection circuit 105V includes a bias circuit 110V, a comparator 120V, and a D flip-flop 125V. Disconnection detection signal CMPBV is input as EN signal to each of bias circuit 110V, comparator 120V, and D flip-flop 125V. In other words, when EN signal is at L level, each of bias circuit 110V, comparator 120V, and D flip-flop 125V comes into a power-off state and stops a circuit operation.

Bias circuit 110V generates bias voltages VINV, VREFV, based on voltage AVCC and voltage AGND.

Figure 19:
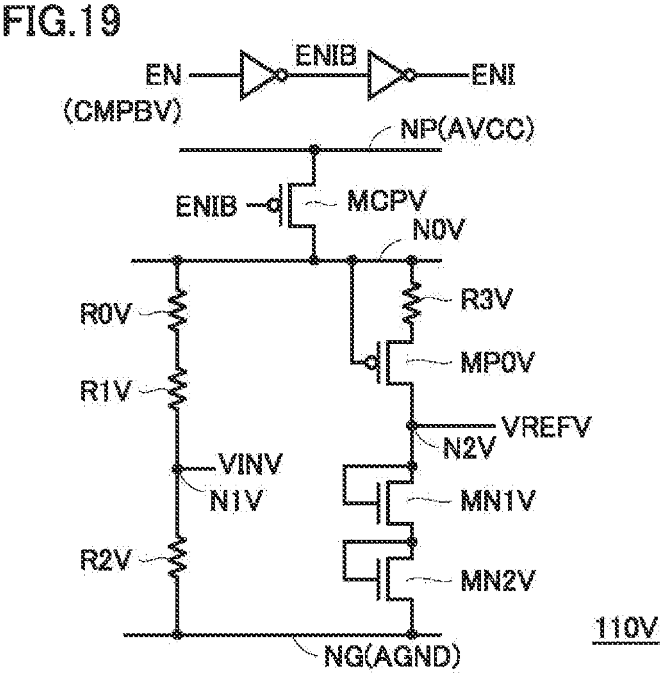
FIG. 19 is a circuit diagram illustrating a configuration example of a bias circuit shown in FIG. 18.
Figure 20:
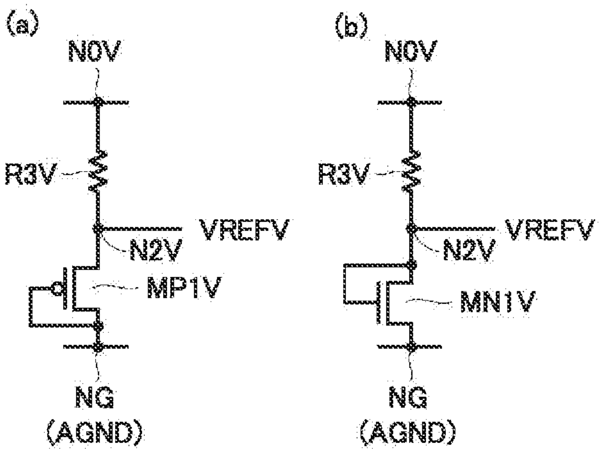
FIG. 20 is a circuit diagram illustrating a modification of the configuration of the bias circuit shown in FIG. 19.

A configuration example of bias circuit 110V and a modification thereof are shown in FIG. 19 and FIG. 20.

In the configuration example in FIG. 19, bias circuit 110V includes resistor elements R0V, R1V, R2V, R3V, a P-type transistor MPOV, N-type transistors MN1V, MN2V, and a P-type transistor MCPV for power-off. In bias circuit 110V, transistor MCPV corresponds to an embodiment of "power-off circuit".

Transistor MCPV is connected between power supply node NP and node N0V. A signal ENIB which is an inversion of disconnection detection signal CMPBV input as EN signal is input to the gate of transistor MCPV. In other words, the logic level of signal ENIB is similar to that of disconnection detection signal CMPV. Transistor MCPV turns on during circuit operation (EN=H level) and turns off in a power-off state (EN=L level). Hereinafter, the operation of bias circuit 110V during circuit operation in which node N0V is connected to power supply node NP will be described.

Resistor elements R0V and R1V are connected in series between node N0V and node N1V at which bias voltage VINV is produced. Resistor element R2V is connected between node N1V and GND node NG. Therefore, bias voltage VINV is the one obtained by dividing a voltage difference between voltage AVCC and voltage AGND.

Transistor MPOV and resistor element R3V are connected in series between node N0V and node N2V at which bias voltage VREFV is produced. Transistor MPOV is configured to have a threshold voltage Vt such that drain current flows when the gate-source voltage is 0 [V]. For example, transistor MPOV can be configured with a native PMOS transistor (or depletion-type PMOS transistor). The gate of transistor MPOV is connected to node N0V. Thus, transistor MPOV in the on state and resistor element R3V operate as a constant current source connected between node N0V and N2V. Transistors MN1V and MN2V are connected in series between node N2V and GND node NG and form a series path together with transistor MPOV and resistor element R3V between power supply node NP and GND node NG. Each of transistors MN1V and MN2V is diode-connected.

Figure 21:
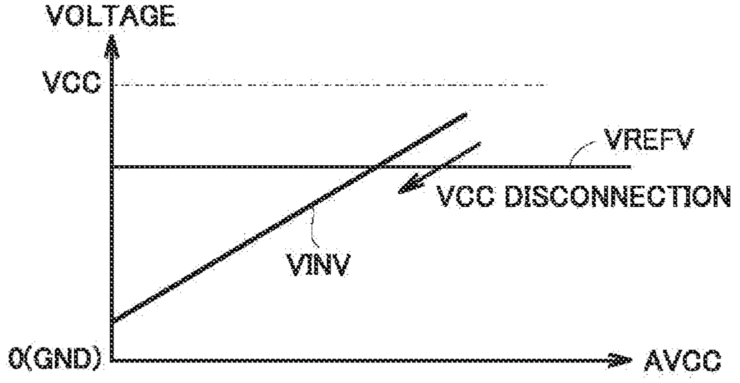
FIG. 21 is a conceptual diagram illustrating the operation of the bias circuit shown in FIG. 18.

FIG. 21 shows a graph conceptually depicting the behavior of bias voltages VINV, VREFV for change in voltage AVCC for explaining the operation of bias circuit 110V.

As shown in FIG. 21, bias voltage VINV is proportional to a voltage difference between voltage AVCC and voltage AGND. Therefore, when VCC disconnection occurs, voltage AGND is constant, while bias voltage VINV decreases as voltage AVCC decreases.

On the other hand, in the series path including node N2V, transistors MN1V and MN2V act as a diode through which constant current by transistor MPOV and resistor element R3V passes, and thus bias voltage VREFV is generated using a forward voltage of the diode with transistors MN1V and MN2V. Therefore, if voltage AGND does not change, reduction of voltage AVCC has little effect on bias voltage VREFV. Thus, bias voltage VREFV is at a substantially constant level for change in voltage AVCC and thus does not change much from a normal state (at a time of non-occurrence of VCC disconnection) even when voltage AVCC decreases at a time of occurrence of VCC disconnection. In this way, compared with bias voltage VINV, bias voltage VREFV has low sensitivity to a voltage change (decrease) at power supply node NP. In other words, bias voltage VREFV corresponds to an embodiment of "first bias voltage", and bias voltage VINV corresponds to an embodiment of "second bias voltage".

Therefore, it is understood that VINV>VREFV is attained in a normal state (at a time of non-occurrence of VCC disconnection) by appropriately setting the voltage division ratio by resistor elements R0V to R2V, whereas conversely, VINV<VREFV is attained when voltage AVCC decreases due to VCC disconnection. In this way, bias circuit 110V operates to generate bias voltages VINV, VREFV whose level relation is reversed between in a normal state and at a time of VCC disconnection.

The configuration for generating bias voltage VREV in FIG. 19 may be modified to a configuration shown in FIG. 20. For example, as shown in FIG. 20(*a*), a similar bias voltage VREFV can be generated with a simple configuration with resistor element R3V connected between node N0V and node N2V and P-type transistor MP1V (diode-connection).

Alternatively, as shown in FIG. 20(*b*), a similar bias voltage VREFV can be generated with a simple configuration with resistor element R3V connected between node N0V and node N2V and N-type transistor MN1V (diode-connection) connected between node N2V and GND node NG.

In the configuration example in FIG. 19, compared with the modifications in FIGS. 20(a) and (b), the number of circuit elements is increased, while the independency (low sensitivity) of bias voltage VREFV from change in voltage AVCC is improved.

In bias circuit 110V, in a power-off state in which EN=L level, transistor MCPV is turned off, so that node N0V is isolated from power supply node NP. Consequently, the current path between power supply node NP and GND node NG is interrupted inside bias circuit 110V, thereby implementing the power-off function of bias circuit 110V.

Figure 22:
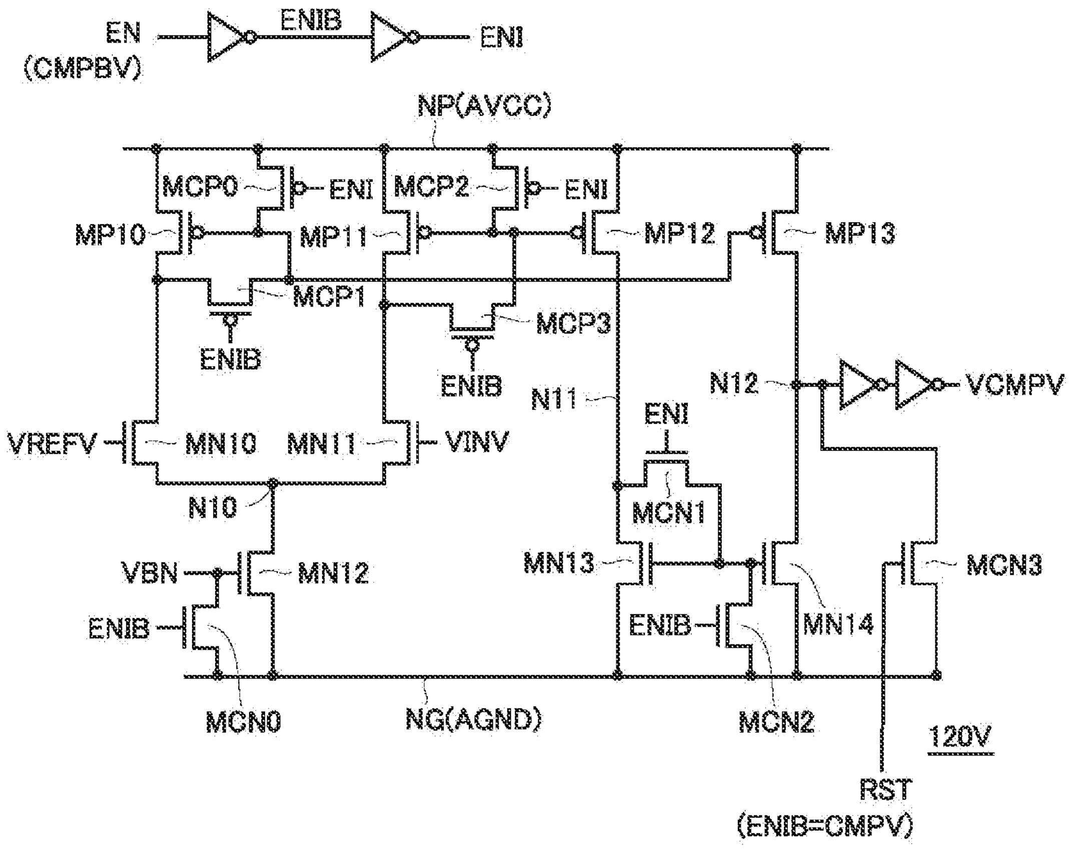
FIG. 22 is a circuit diagram illustrating a configuration example of a comparator shown in FIG. 18.

Referring to FIG. 18 again, bias voltages VINV and VREFV generated by bias circuit 110V are respectively input to the (−) input terminal and the (+) input terminal of comparator 120V. Comparator 120V has a function similar to that of comparator 120G described in the first embodiment and produces output signal VCMPV in accordance with a voltage comparison result of the (−) input terminal and the (+) input terminal. Therefore, at a time of non-occurrence of VCC disconnection in which VINV>VREFV (in a normal state), VCMPV=L level is set. On the other hand, at a time of VCC disconnection in which VINV<VREFV, VCMPV=H level is set. FIG. 22 shows a circuit diagram illustrating a configuration example of comparator 120V.

As shown in FIG. 22, comparator 120V has a configuration similar to comparator 120G shown in FIG. 7. In other words, comparator 120V includes P-type transistors MP10 to MP13 and N-type transistors MN10 to MN14 to constitute a two-stage amplifier, and P-type transistors MCP0 to MCP3 and N-type transistors MCN0 to MCN3 for a power-off function.

The arrangement and connection manner of these transistors MP10 to MP13, MN10 to MN14, and transistors MCP0 to MCP3, MCN0 to MCN3 are similar to those in FIG. 7 and will not be further elaborated. The voltage of node N12 is amplified by the two-stage (even-numbered stage) inverter and output as a binary output signal VCMPV from comparator 120V, in the same manner as in comparator 120G (FIG. 7).

In comparator 120V, the gate of transistor MN10 corresponding to the (+) input terminal in FIG. 18 receives bias voltage VREFV from bias circuit 110V. On the other hand, the gate of transistor MN11 corresponding to the (−) input terminal in FIG. 18 receives bias voltage VINV from bias circuit 110V.

Also in comparator 120V, during circuit operation in which EN=H level (ENI=H level, ENIB=L level), a voltage difference that is the amplified difference between the gate voltage of transistor MN10 (voltage of the (+) input terminal) and the gate voltage of transistor MN11 (voltage of the (−) input terminal) is produced between nodes N11 and N12. Therefore, when VINV>VREFV, VCMPV=AGND (L level), whereas when VINV<VREFV, VCMPV=AVCC (H level).

On the other hand, during power-off in which EN=L level (ENI=L level, ENIB=H level), P-type transistors MP10 to MP13 and N-type transistors MN12 to MN14 are turned off to stop the circuit operation of the two-stage amplifier, and the current path between power supply node NP and GND node NG is interrupted inside comparator 120V. As a result, the power-off function of comparator 120V is implemented.

Also in comparator 120V, during power-off (ENIB=H level), transistor MCN3 turns on, so that output signal VCMPV is reset to L level.

Referring to FIG. 18 again, output signal VCMPV of comparator 120V is input to D flip-flop 125V. D flip-flop 125V operates when EN signal=H level and stops into a power-off state when EN signal=L level, in the same manner as D flip-flop 125G. In the second embodiment, an output signal (OUT) of D flip-flop 125V serves as disconnection detection signal CMPV. An inversion output signal (OUTB) of D flip-flop 125V serves as disconnection detection signal CMPBV having a logic level opposite to that of disconnection detection signal CMPV.

In response to input of reset signal FRST similar to that in the first embodiment, D flip-flop 125V initializes disconnection detection signal CMPV to L level (CMPBV=H level).

If VCC disconnection does not occur at start-up of semiconductor device 100C, VINV>VREFV in bias circuit 110V and therefore output signal VCMPV of comparator 120V is at L level, and VCMPV=L level is kept as long as VCC disconnection does not occur.

Therefore, in D flip-flop 125V, while an input signal (IN) is kept at L level after the initialization, disconnection detection signal CMPV is kept at L level (CMPBV=H level).

On the other hand, when VCC disconnection occurs to cause change to VINV<VREFV in bias circuit 110 V, disconnection detection signal CMPV changes from L level to H level in response to output signal VCMPV of comparator 120V, that is, an input signal (IN) of D flip-flop 125V changing from L level to H level. Conversely, disconnection detection signal CMPBV changes from H level to L level.

In this way, in a normal state, disconnection detection circuit 105V sets disconnection detection signal CMPV=L level (CMPBV=H level). EN signal to bias circuit 110V, comparator 120V, and D flip-flop 125V is set to H level (circuit operating state). On the other hand, at a time of VCC disconnection, disconnection detection circuit 105V sets disconnection detection signal CMPV=H level (CMPBV=L level). EN signal to bias circuit 110V, comparator 120V, and D flip-flop 125V is set to L level (power-off state).

Delay circuit 130V generates delay signals CMPVD and CMPBVD by delaying disconnection detection signals CMPV and CMPBV, respectively, from disconnection detection circuit 105V.

Figure 23:
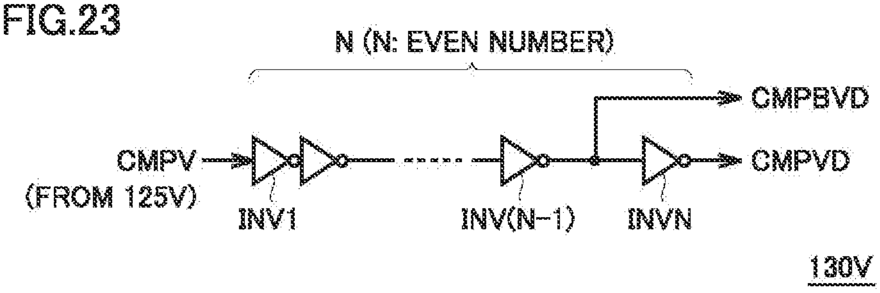
FIG. 23 is a circuit diagram illustrating a configuration example of a delay circuit shown in FIG. 18.

FIG. 23 shows a configuration example of delay circuit 130V.

As shown in FIG. 23, delay circuit 130V can be configured with N (where Nis an even number equal to or larger than 2) inverters INV1 to INVN connected in series, in the same manner as delay circuit 130G (FIG. 8). In delay circuit 130V, inverter INV1 at the first stage receives disconnection detection signal CMPV from D flip-flop 125V, and inverter INVN at the last stage outputs delay signal CMPVD of disconnection detection signal CMPV.

Delay time Td by delay circuit 130V can be adjusted by the number of inverters (N), in the same manner as delay circuit 130G. Delay signal CMPBVD of disconnection detection signal CMPBV may be output from inverter INV(N−1) one stage before the last stage. Alternatively, N inverters for generating delay signal CMPBVD may be provided separately from inverters INV1 to INVN in FIG. 23.

Figure 24:
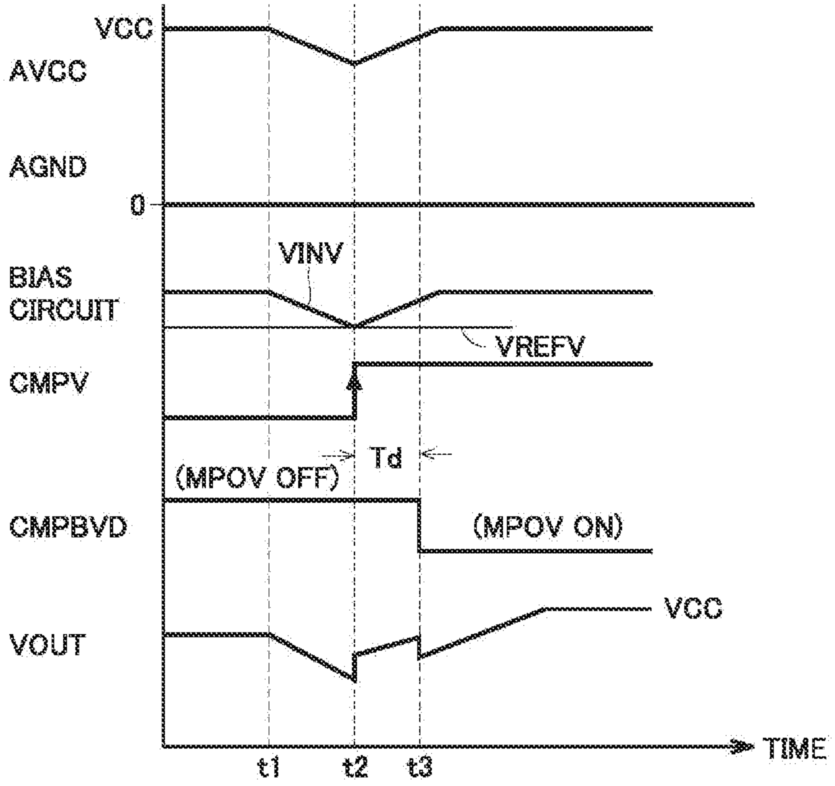
FIG. 24 is an operation waveform diagram of the semiconductor device according to the second embodiment.

Referring now to FIG. 24 and FIG. 18, the operation of semiconductor device 100C according to the second embodiment at a time of VCC disconnection will be described.

As shown in FIG. 24, before VCC disconnection occurs at time t1, AVCC=VCC and AGND-GND are stable. In such a normal state, as VIV>VREFV in bias circuit 110V, disconnection detection signal CMPV is at L level. Thus, as shown in FIG. 3, EN signal (disconnection detection signal CMPBV) is set to H level and a circuit operation is performed in each of bias circuit 110V, comparator 120V, and D flip-flop 125V.

In operational amplifier circuit 150, transistors MPC1, MNC1 are turned off and transistors MPC2, MNC2 are turned on in output transistor control circuits 180P, 180N, so that normal circuit operation is performed.

As shown in FIG. 24, when VCC disconnection occurs at time t1, voltage AVCC of power supply node NP is not fixed to power supply voltage VCC and gradually decreases. FIG. 24 illustrates a waveform of AVCC decreasing immediately after time t1, for convenience of illustration, but actually, voltage AVCC may be power supply voltage VCC immediately after occurrence of VCC disconnection.

In response to decrease of voltage AVCC, bias voltage VREFV does not change and bias voltage VINV decreases in bias circuit 110V. As a result, in the operation example in FIG. 24, at time t2, bias voltage VINV becomes lower than bias voltage VREFV. In response, disconnection detection signal CMPV changes from L level to H level. Conversely, disconnection detection signal CMPBV used as EN signal changes from H level to L level. In response, the control operation for handling VCC disconnection is started in semiconductor device 100C.

Referring to FIG. 18 again, conversely to a normal state, transistors MPC2, MNC2 are turned off and transistors MPC1, MNC1 are turned on in output transistor control circuits 180P, 180N in operational amplifier circuit 150. As a result, each of output transistors MPOUT and MNOUT attains the same potential at the gate and the source and is then turned off.

Further, in response to disconnection detection signal CMPV changing to H level (CMPBV is at L level), semiconductor device 100C transitions to a power-off state. In a power-off state, EN=L level is set, and bias circuit 110V, comparator 120V, and D flip-flop 125V in FIG. 18 are brought into a power-off state, so that current generated between power supply node NP and GND node NG is interrupted.

As shown in FIG. 23, due to this current interruption effect, after time t2, when VCC disconnection is occurring, current flowing out of power supply node NP is interrupted and thereby voltage AVCC increases and output voltage VOUT also increases. Since decrease of voltage AVCC is avoided, occurrence of abnormal current Iabn2 described in FIG. 17 can be prevented.

At time t3 when delay time Td by delay circuit 130V has passed since time t2, delay signal CMPBVD output by delay circuit 130V changes from H level to L level. As shown in FIG. 18, at time t3 later than time t2, in response to delay signal CMPBVD being set to L level, pull-up transistor MPOV is turned on. As a result, power supply node NP having VCC disconnection can be electrically connected to power supply 10, outside semiconductor device 100C, via output node No and output terminal 103. In other words, pull-up transistor MPOV can constitute an embodiment of "pull-up circuit".

Consequently, after time t3, since power supply node NP and output terminal 103 are pulled up, stabilization (VOUT=VCC) can be further achieved after increasing the voltage of output terminal 103. Further, since voltage AVCC of power supply node NP having disconnection is fixed to power supply voltage VCC, the effect of preventing occurrence of abnormal current Iabn2 can be further enhanced after time t3.

On the other hand, at time t3, if current is produced at output node No or power supply node NP, turning on of pull-up transistor MPOV causes the current to be led to a short-circuit loop path including output transistor MPOUT and pull-up transistor MPOV connected in parallel.

Therefore, after semiconductor device 100C transitions to a power-off state at time t2, it is necessary to decrease current sufficiently to substantially zero and then turn on pull-up transistor MPOV. Delay time Td can be preset in accordance with the time taken for total current value Itt1 to decrease to limit current value Ilmt or lower since semiconductor device 100C transitions to a power-off state, based on the result of actual device test or the like, in the same manner as in the first embodiment.

Consequently, in the semiconductor device according to the second embodiment, in response to detection of VCC disconnection at time t2 in FIG. 24, output transistor MPOUT is forcibly turned off and semiconductor device 100C transitions to a power-off state to avoid decrease of voltage AVCC, thereby preventing occurrence of abnormal current Iabn2 (FIG. 17) resulting from VCC disconnection.

Further, pull-up transistor MPOV is turned on after current flowing through power supply node NP sufficiently decreases after a delay from turning off of output transistor MPOUT, thereby stabilizing the voltage of output terminal 103 (VOUT=VCC).

Figure 25:
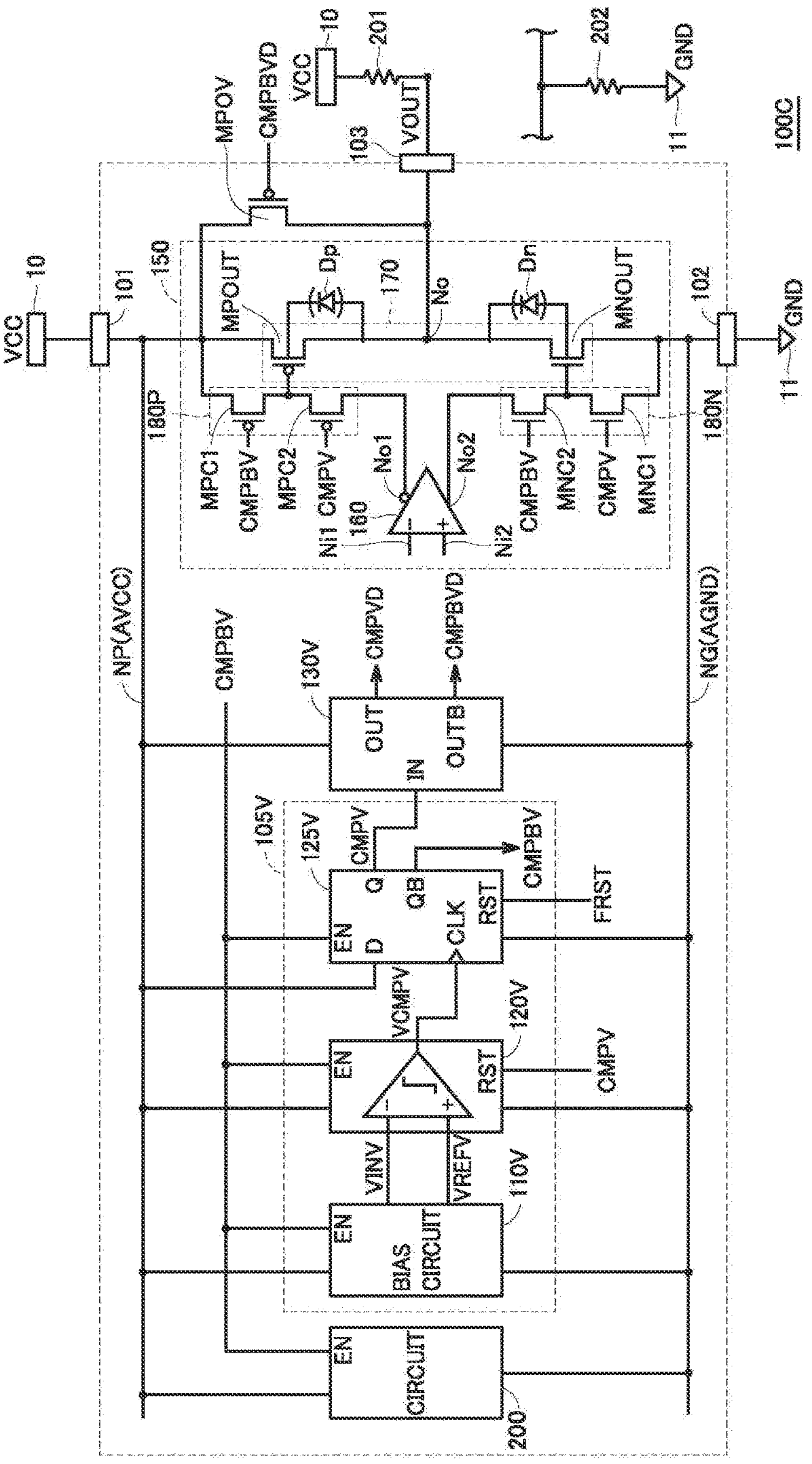
FIG. 25 is a block diagram illustrating a modification of the configuration of the semiconductor device shown in FIG. 18.

As shown in FIG. 25, circuit 200 similar to that of FIG. 11 may be arranged in semiconductor device 100C according to the second embodiment. As explained in FIG. 11, circuit 200 is connected between power supply node NP and GND node NG and has a power-off function in accordance with EN signal common to bias circuit 110V, comparator 120V, and D flip-flop 125V.

Figure 26:
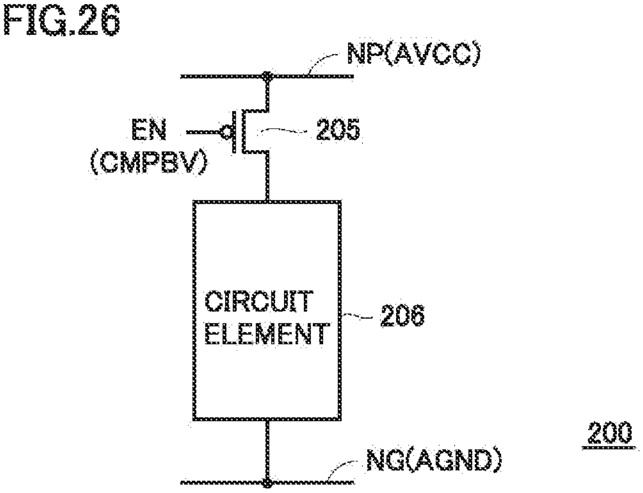
FIG. 26 is a block diagram illustrating a power-off function of a circuit added in FIG. 25.

As shown in FIG. 26, circuit 200 shown in FIG. 25 includes a cut-off transistor 205 and a circuit element 206 connected between power supply node NP and GND node NG. Cut-off transistor 205 is composed of, for example, a P-type transistor and receives an inversion signal of EN signal at the gate. The second embodiment differs from the first embodiment (FIG. 12) in that disconnection detection signal CMPBV is input as EN signal.

Also in semiconductor device 100C according to the second embodiment, turning off of cut-off transistor 205 can interrupt the current path between power supply node NP and GND node NG via circuit element 206. In other words, cut-off transistor 205 can constitute an embodiment of "power-off circuit".

In a normal state in which disconnection detection signal CMPV is kept at L level (disconnection detection signal CMPBV is at H level), cut-off transistor 205 turns on to supply current to circuit element 206, so that circuit 200 can perform a desired circuit operation.

On the other hand, at a time of VCC disconnection, in response to disconnection detection signal CMPV changing to H level (disconnection detection signal CMPBV is at L level), cut-off transistor 205 is turned off. As a result, circuit 200 is brought into a power-off state and can cut off current flowing between power supply node NP and GND node NG through circuit element 206. As a result, decrease of voltage AVCC at a time of VCC disconnection due to circuit 200 can be prevented.

Alternatively, also in the second embodiment, in circuit 200, such a circuit may be added that forcibly turns off each transistor connected between power supply node NP and GND node NG by connecting the gate of the transistor to power supply node NP or GND node NG in response to disconnection detection signals CMPV, CMPBV, thereby implementing a power-off function, in the same manner as in comparator 120G described in FIG. 7.

Also in semiconductor device 100C, a "power-off circuit" in accordance with disconnection detection signals CMPV, CMPBV can be configured with a circuit similar to that of FIG. 7 for differential amplifier 160 of operational amplifier circuit 150, in the same manner as described in the first embodiment.

Also in semiconductor device 100C, the power-off state does not necessarily require that the above power-off function should be provided in all circuits.

Figure 27:
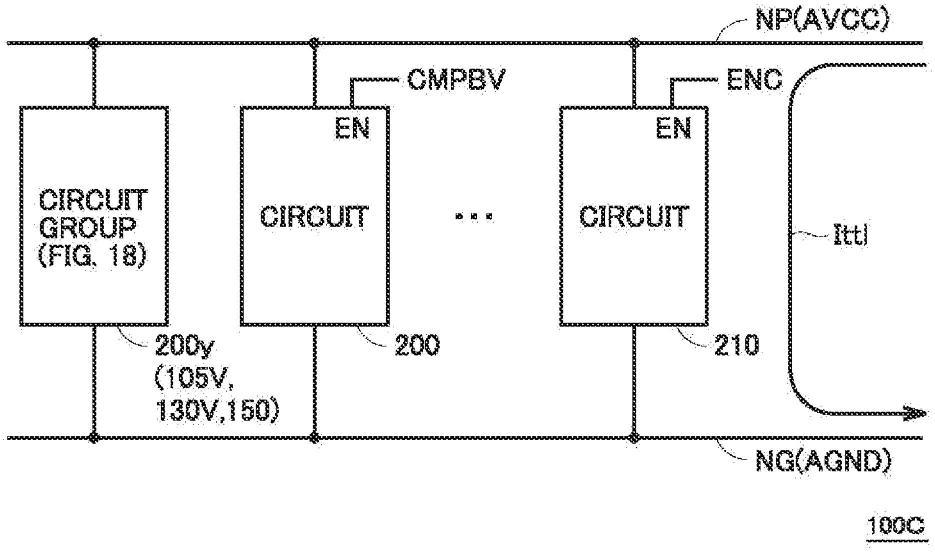
FIG. 27 is a block diagram illustrating another modification of the configuration of the semiconductor device shown in FIG. 18.

For example, as shown in FIG. 27, semiconductor device 100C can include a circuit group 200*y* (105V, 130V, 150) shown in FIG. 18 and at least one circuit 200 (FIG. 26) having a power-off function, and at least one circuit 210 not having a power-off function. In circuit 210, a relatively small current is produced in accordance with a circuit operation both in a normal state and at a time of VCC disconnection, in the same manner as in FIG. 12.

In this way, when a circuit in a power-off state at a time of occurrence of VCC disconnection and a circuit (210) having no power-off function and generating current flowing through power supply node NP are mixed, the power-off state of semiconductor device 100C can be defined by determining a circuit having a power-off state such that total current value Itt1 of semiconductor device 100C flowing between power supply node NP and GND node NG is lower than limit current value Ilmt at a time of VCC disconnection.

In other words, also in the second embodiment (at a time of VCC disconnection), it is necessary that total current value Itt1 flowing through power supply node NP in the entire semiconductor device 100C at a time of VCC disconnection should be lower than current value Id described in the first embodiment (FIG. 13), that is, a lower limit current value at which a forward voltage occurs in body diode Dp of output transistor MPOUT, in the same manner as in the first embodiment (at a time of GND disconnection).

As long as total current value Itt1 in a power-off state in response to detection of VCC disconnection is lower than limit current value Ilmt set lower than the above lower limit current value Id, it is not necessary to set all in the circuit group connected between power supply terminal 101 and ground terminal 102 inside semiconductor device 100C to a power-off state at a time of VCC disconnection. In other words, the power-off state of semiconductor device 100C is equivalent to that at least a part of the circuit group connected between power supply node NP and GND node NG is provided with a power-off function responsive to detection of VCC disconnection such that total current value Itt1 is lower than limit current value Ilmt. Also in the second embodiment, in which circuit of the above circuit group should be provided with a power-off function in order to implement the power-off function of semiconductor device 100C can be determined, for example, by current value measurement in an implementation test.

Modification of Second Embodiment

In a modification of the second embodiment, a configuration for suppressing false detection of disconnection at power-on, that is, at start-up of semiconductor device 100C will be described.

Figure 28:
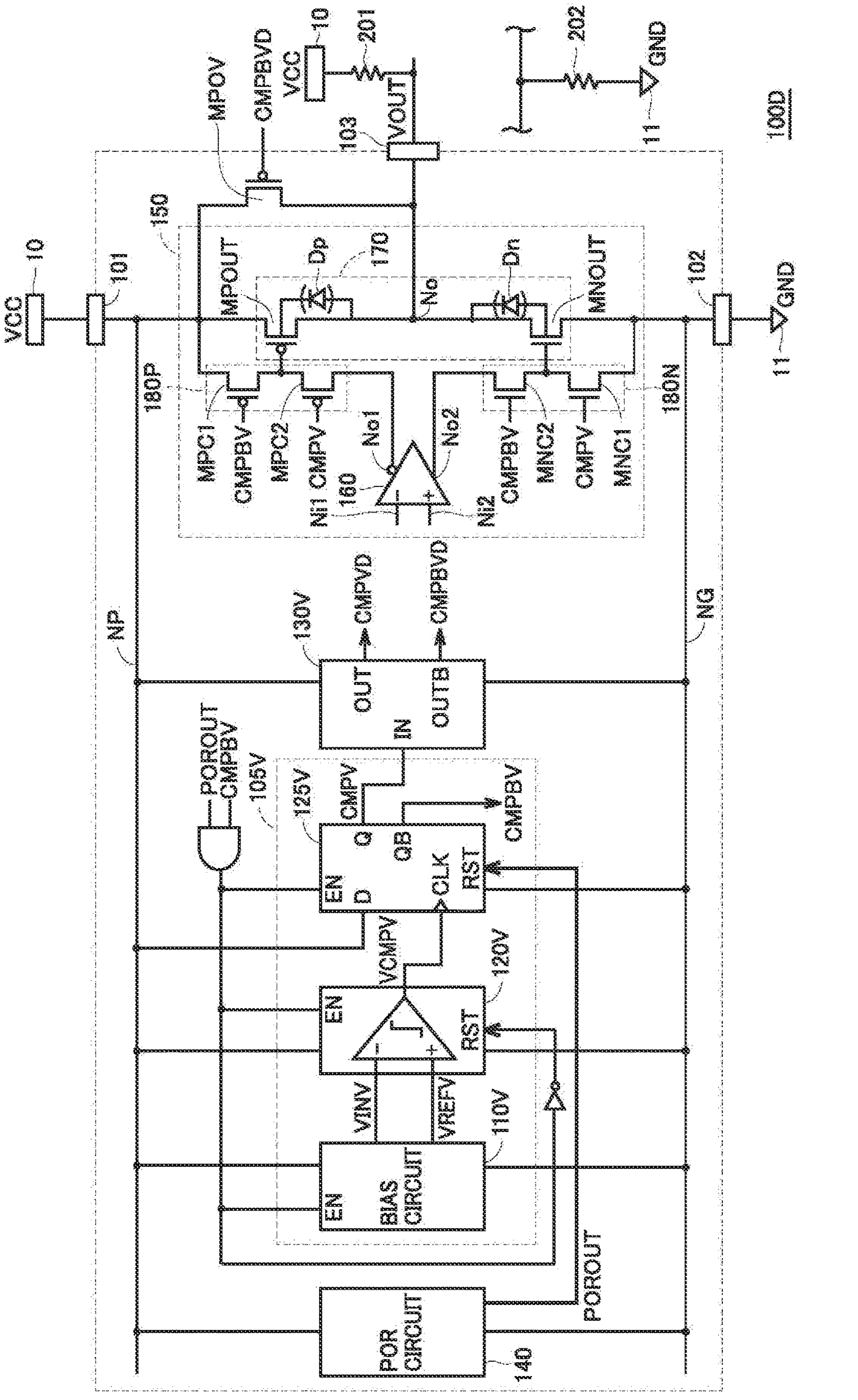
FIG. 28 is a block diagram illustrating a configuration of a semiconductor device according to a modification of the second embodiment.

FIG. 28 is a block diagram illustrating a configuration of a semiconductor device 100D according to a modification of the second embodiment.

As shown in FIG. 28, semiconductor device 100D according to a modification of the second embodiment differs from the configuration of semiconductor device 100C described in the second embodiment in that it further includes a POR circuit 140.

POR circuit 140 is configured in the same manner as shown in FIG. 14 and FIG. 15 and generates POROUT signal in accordance with voltage VACC of power supply node NP. In other words, POROUT signal has an initial value at power-on at L level and changes from L level to H level when voltage AVCC becomes higher than a predetermined voltage.

In semiconductor device 100D, EN signal input to bias circuit 110V, comparator 120V, and D flip-flop 125V is generated by AND (logical conjunction) of disconnection detection signal CMPBV similar to that in the second embodiment and POROUT signal. Also in semiconductor device 100D, circuit 200 (with a power-off function) receiving EN signal as explained in FIG. 25 and FIG. 26 may be further arranged.

Therefore, in a modification of the second embodiment, EN signal=L level is kept in a period of POROUT=L level, that is, until voltage AVCC rises at power-on. Consequently, bias circuit 110V, comparator 120V, and D flip-flop 125V do not start operation. POROUT signal can be applied to reset signal RST of D flip-flop 125V.

Consequently, in a period of POTOUT=L level, that is, in a period until voltage AVCC rises at power-on, the operation of disconnection detection circuit 105V is waited equivalently, thereby preventing disconnection detection signals CMPV and CMPBV from changing from the respective initial values, L level and H level.

After rising of voltage AVCC, POROUT signal is kept at H level, and therefore EN signal has the same logic level as disconnection detection signal CMPBV changing from H level to L level at a time of VCC disconnection, in the same manner as in the second embodiment. Therefore, semiconductor device 100D can operate in the same manner as 100C according to the second embodiment.

In this way, the semiconductor device according to a modification of the second embodiment can prevent false detection of VCC disconnection at power-on and stabilize the operation at start-up, in addition to the effect in the second embodiment.

Third Embodiment

In a third embodiment, a configuration of a semiconductor device for handling both of GND disconnection and VCC disconnection will be described.

Figure 29:
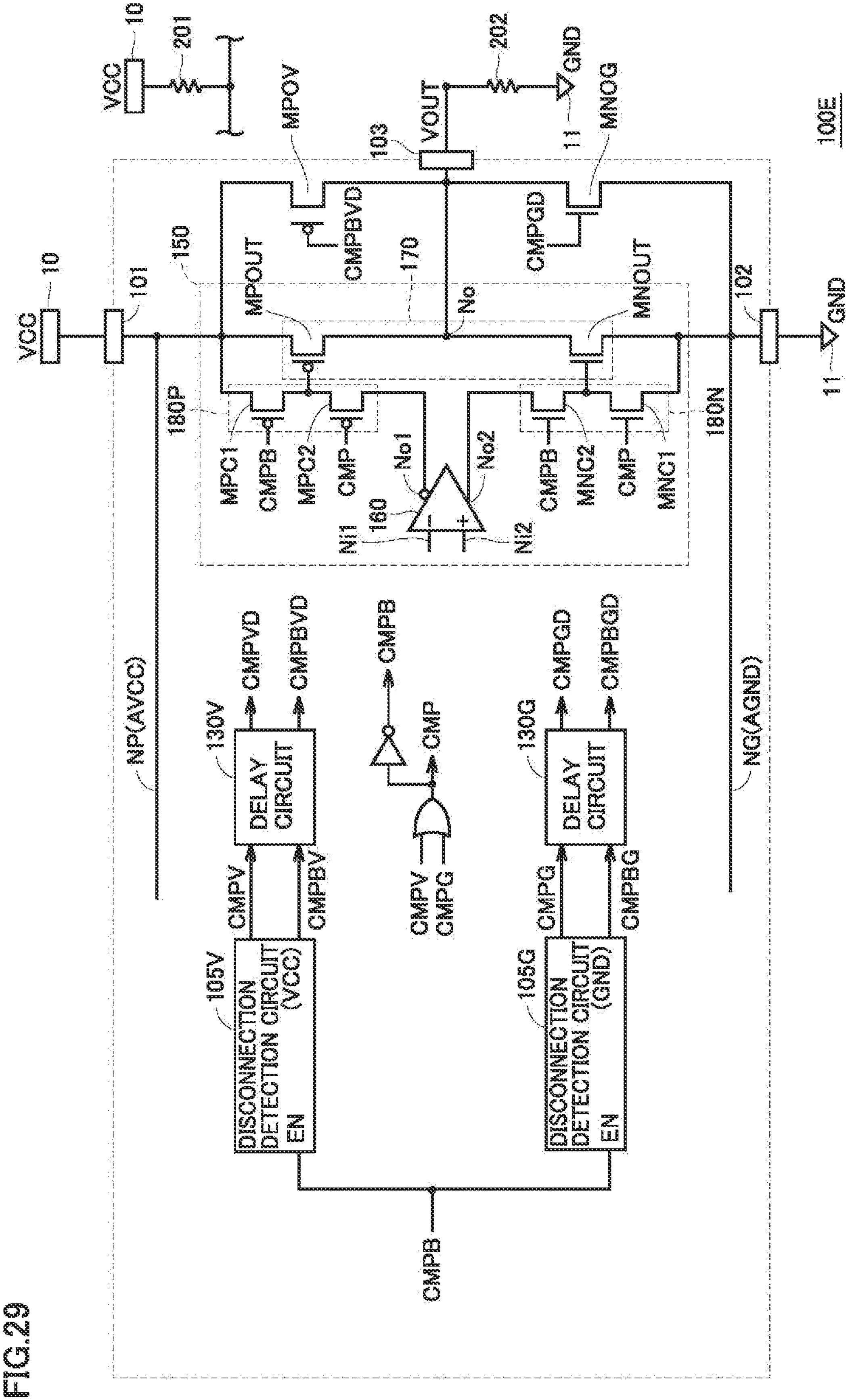
FIG. 29 is a block diagram illustrating a configuration of a semiconductor device according to a third embodiment.

FIG. 29 is a block diagram illustrating a configuration of a semiconductor device 100E according to the third embodiment.

As shown in FIG. 29, semiconductor device 100E according to the third embodiment includes, in addition to the configuration of semiconductor device 100 in FIG. 1, disconnection detection circuit 105G and delay circuit 130G similar to those of semiconductor device 100A (FIG. 3), disconnection detection circuit 105V and delay circuit 130V similar to those of semiconductor device 100C (FIG. 18), output transistor control circuits 180P, 180N, and both of pull-down transistor MNOG and pull-up transistor MPOV.

Disconnection detection circuit 105G generates disconnection detection signals CMPG, CMPBG similar to those of the first embodiment for detecting GND disconnection. Delay circuit 130G generates delay signals CMPGD, CMPBGD by adding a delay time to disconnection detection signals CMPG, CMPBG. Similarly, disconnection detection circuit 105V generates disconnection detection signals CMPV, CMPBV similar to those of the second embodiment for detecting VCC disconnection. Delay circuit 130V generates delay signals CMPVD, CMPBVD by adding a delay time Td to disconnection detection signals CMPV, CMPBV.

In the third embodiment, disconnection detection signal CMP by the OR (logical disjunction) operation result of disconnection detection signals CMPV and CMPG is further generated. Disconnection detection signal CMP has an initial value at L level and kept at L level while neither VCC disconnection nor GND disconnection occurs. On the other hand, when at least one of VCC disconnection and GND disconnection occurs, disconnection detection signal CMP changes from L level to H level. Disconnection detection signal CMPB is an inversion signal of disconnection detection signal CMP. In other words, disconnection detection signal CMPB is set to H level in a normal state and changes from H level to L level when at least one of VCC disconnection and GND disconnection occurs. In semiconductor device 100E, disconnection detection signal CMPB is input as EN signal to disconnection detection circuits 105G, 105V and the like.

Output transistor control circuits 180P and 180N include P-type transistors MPC1, MPC2 and N-type transistors MNC1, MNC2, respectively, connected to output transistors MPOUT, MNOUT, in the same manner as in FIG. 3 (semiconductor device 100A). Disconnection detection signal CMP is input to the gates of transistors MPC2, MNC1. Disconnection detection signal CMPB is input to the gates of transistors MPC1, MNC2.

Pull-down transistor MNOG is connected between output node No and GND node NG and receives delay signal CMPGD at the gate, in the same manner as in FIG. 3. In other words, pull-down transistor MNOG operates in the same manner as in the first embodiment at a time of GND disconnection.

Pull-up transistor MPOV is connected between output node No and power supply node NP and receives delay signal CMPBVD at the gate, in the same manner as in FIG. 18. In other words, pull-up transistor MPOV operates in the same manner as in the second embodiment at a time of VCC disconnection.

Also in semiconductor device 100E, circuit 200 having a power-off function at a time of disconnection detection in accordance with EN signal as explained in FIG. 11, FIG. 12 and FIG. 25, FIG. 26 and/or circuit 210 not having a power-off function at a time of disconnection detection as explained FIG. 13 and FIG. 27 may be arranged between power supply node NP and GND node NG.

In semiconductor device 100E, in a normal state in which neither VCC disconnection nor GND disconnection occurs (CMP=L, CMBP=H), transistors MPC1, MNC1 are turned off and transistors MPC2, MNC2 are turned on in output transistor control circuits 180P, 180N. As a result, operational amplifier circuit 150 can perform an operation in a normal state in the first and second embodiments. Further, since EN=H level is set, disconnection detection circuits 105G, 105V and circuit 200 perform a normal circuit operation.

In semiconductor device 100E, at a time of GND disconnection, disconnection detection signal CMP is set to H level, so that transistors MPC2, MNC2 are turned off and transistors MPC1, MNC1 are turned on in output transistor control circuits 180P, 180N, conversely to a normal state. As a result, each of output transistors MPOUT and MNOUT is turned off.

Furthermore, EN signal in each circuit is set to L level so as to follow disconnection detection signal CMPB, so that semiconductor device 100E transitions to a power-off state. Subsequently, pull-down transistor MNOG operates in accordance with delay signal CMPGD in the same manner as in the first embodiment, so that output terminal 103 and GND node NG are pulled down. In this way, the control operation at a time of GND disconnection described in the first embodiment is also performed in semiconductor device 100E according to the third embodiment.

In semiconductor device 100E, at a time of VCC disconnection, disconnection detection signal CMP is set to H level, so that transistors MPC2, MNC2 are turned off and transistors MPC1, MNC1 are turned on in output transistor control circuits 180P, 180N, in the same manner as at a time of GND disconnection. As a result, each of output transistors MPOUT and MNOUT is turned off, and EN signal in each circuit is set to L level, so that semiconductor device 100E transitions to a power-off state. Subsequently, pull-up transistor MPOV operates in accordance with delay signal CMPBVD in the same manner as in the second embodiment, so that output terminal 103 and power supply node NP are pulled up. In this way, the control operation at a time of VCC disconnection described in the second embodiment is also performed in semiconductor device 100E according to the third embodiment.

A power-off state in semiconductor device 100E also can be defined using the relation between total current value Itt1 (FIG. 12) of semiconductor device 100E when EN signal is set to L level, and the characteristics of body diodes Dp, Dn of output transistors MPOUT, MNOUT, in the same manner as in semiconductor device 100C, 100E in the first or second embodiment.

Consequently, in semiconductor device 100E according to the third embodiment, when either pull-up resistor 201 or pull-down resistor 202 is connected to output terminal 103, occurrence of abnormal current can also be prevented by the control operation in the first embodiment at a time of GND disconnection or the control operation in the second embodiment at a time of VCC disconnection.

Modification of Third Embodiment

Figure 30:
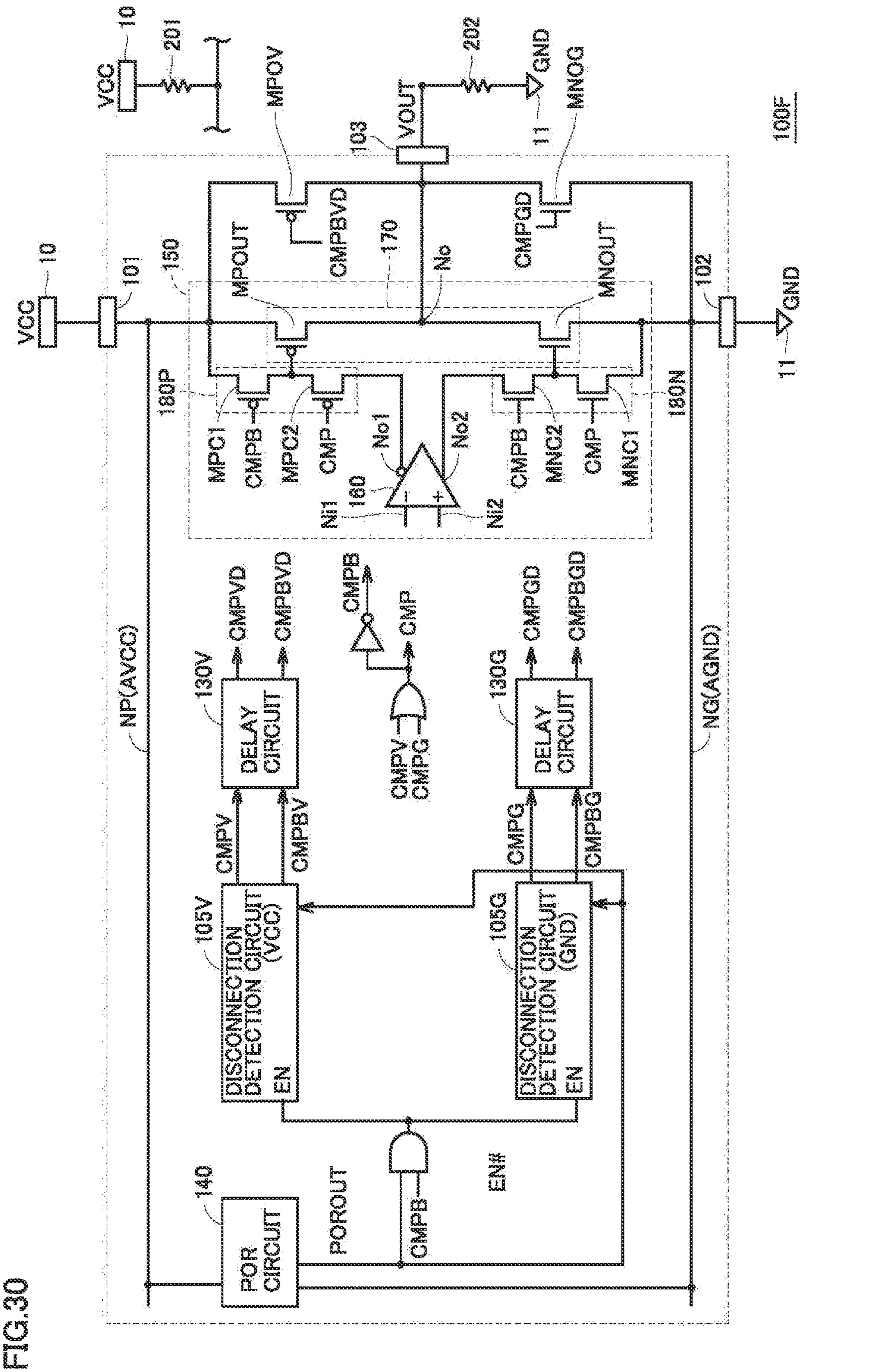
FIG. 30 is a block diagram illustrating a configuration of a semiconductor device according to a modification of the third embodiment.

FIG. 30 is a block diagram illustrating a configuration of a semiconductor device according to a modification of the third embodiment.

FIG. 30 is a block diagram illustrating a configuration of a semiconductor device 100F according to a modification of the third embodiment.

As shown in FIG. 30, semiconductor device 100F according to a modification of the third embodiment differs from the configuration of semiconductor device 100E described in the third embodiment in that it further includes a POR circuit 140.

POR circuit 140 is configured in the same manner as the modifications of the first and second embodiments and generates POROUT signal in accordance with voltage VACC of power supply node NP. In other words, POROUT signal has an initial value at power-on at L level and changes from L level to H level when voltage AVCC becomes higher than a predetermined voltage.

In semiconductor device 100F, EN signal input to disconnection detection circuits 105G, 105V and the like is generated by AND (logical conjunction) of disconnection detection signal CMPB similar to that of the third embodiment and POROUT signal. Also in semiconductor device 100F, circuit 200 (with a power-off function) receiving EN signal may be further arranged.

Therefore, in a modification of the third embodiment, EN signal=L level is kept in a period of POROUT=L level, that is, until voltage AVCC rises at power-on. Consequently, since disconnection detection circuits 105G, 105V do not start operation, disconnection detection signals CMPG, CMPV, CMP and disconnection detection signals CMPBG, CMPBV, CMPB can be prevented from changing from their respective initial values, in a period until voltage AVCC rises at power-on.

After rising of voltage AVCC, POROUT signal is kept at H level, and therefore EN signal changes from H level to L level at a time of occurrence of GND disconnection or VCC disconnection, in the same manner as in the first or second embodiment. Therefore, semiconductor device 100F can operate in the same manner as 100E according to the third embodiment.

In this way, the semiconductor device according to a modification of the third embodiment can prevent false detection of disconnection at power-on and stabilize the operation at start-up, in addition to the effect in the third embodiment.

In this way, according to the third embodiment and a modification thereof, even when it is unknown which of pull-up resistor 201 and pull-down resistor 202 is connected to output terminal 103 outside the semiconductor device, the semiconductor device is configured to handle both of abnormal current at a time of GND disconnection under pull-down as explained in FIG. 2 and abnormal current at a time of VCC disconnection under pull-up as explained in FIG. 17, thereby increasing versatility.

On the other hand, when a circuit design premised on that pull-up resistor 201 is connected to output terminal 103 (pull-down resistor 202 is not connected) is permitted, semiconductor device 100A, 100B according to the first embodiment or a modification thereof can be employed to reduce circuit elements. Similarly, when a circuit design premised on that pull-down resistor 202 is connected to output terminal 103 (pull-up resistor 201 is not connected) is permitted, semiconductor device 100C, 100D according to the second embodiment or a modification thereof can be employed to reduce circuit elements.

In the present embodiment, a configuration example in which both of output transistor control circuit 180P for output transistor MPOUT and output transistor control circuit 180N for output transistor MNOUT are arranged in semiconductor device 100A, 100B for handling GND disconnection and semiconductor device 100C, 100D for handling VCC disconnection has been described. This configuration can enhance the effect of preventing abnormal current by forcibly turning off both of output transistors MPOUT and MNOUT both at a time of disconnection and at a time of GND disconnection.

However, in principle, for GND disconnection, turning off of output transistor MNOUT is essential, whereas even without turning off output transistor MPOUT, abnormal current Iabn1 (FIG. 2) may be able to be prevented. In other words, in semiconductor devices 100A, 100B according to the first embodiment and a modification thereof, the arrangement of output transistor control circuit 180P may be omitted, in principle.

Conversely, for VCC disconnection, turning off of output transistor MPOUT is essential, whereas even without turning off output transistor MNOUT, abnormal current Iabn2 (FIG. 17) may be able to be prevented. In other words, in semiconductor devices 100C, 100D according to the second embodiment and a modification thereof, the arrangement of output transistor control circuit 180N may be omitted, in principle.

Furthermore, in the first to third embodiments and modifications thereof, an example in which pull-down transistor MNOG and pull-up transistor MPOV constitute "pull-down circuit and "pull-up circuit", respectively, has been described. However, "pull-down circuit" and "pull-up circuit" can be configured without pull-down transistor MNOG and pull-up transistor MPOV.

Figure 31:
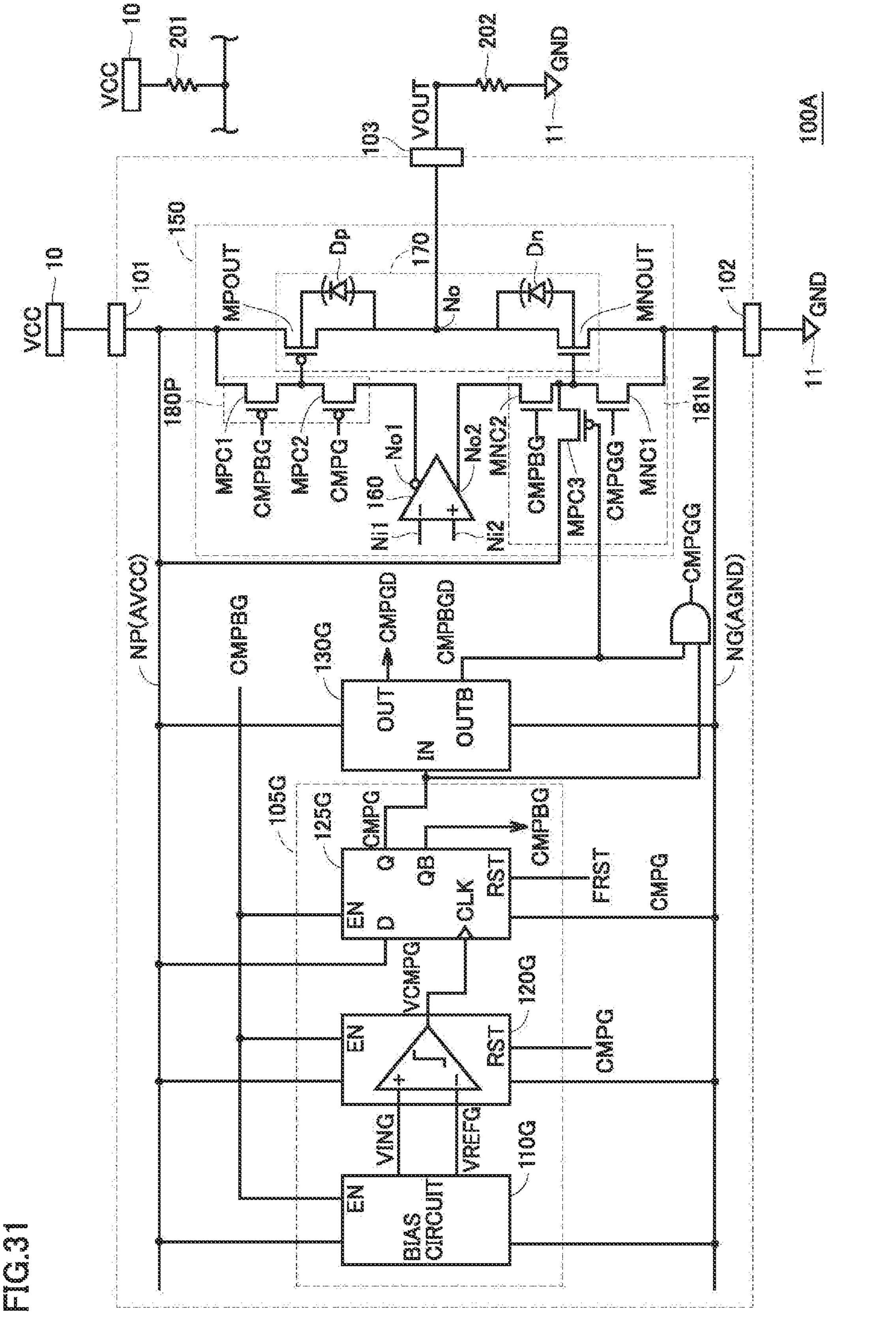
FIG. 31 is a circuit diagram illustrating a modification of a pull-down circuit in the semiconductor device according to the present embodiment.

FIG. 31 shows a modification of "pull-down circuit" in semiconductor device 100A shown in FIG. 3.

The modification in FIG. 31 differs from the configuration shown in FIG. 3 in that an output transistor control circuit 181N is arranged instead of output transistor control circuit 180N (FIG. 3) and that the arrangement of pull-down transistor MNOG (FIG. 3) is omitted.

Output transistor control circuit 181N differs from output transistor control circuit 180N in that it further includes a P-type transistor MPC3 in addition to N-type transistors MNC1, MNC2 and that a control signal CMPGG is input to the gate of transistor MNC1 instead of disconnection detection signal CMPG (FIG. 3).

Transistor MPC3 is connected between power supply node NP and the gate of output transistor MNOUT and receives delay signal CMPBGD at the gate. Delay signal CMPBGD is an inversion signal of delay signal CMPGD and at H level until time t3 in FIG. 9 and set to L level after time t3.

Control signal CMPGG input to the gate of transistor MNC1 is generated by AND (logical conjunction) of disconnection detection signal CMPG and delay signal CMPBGD. Therefore, control signal CMPGG is set to H level between time t2 and t3 in FIG. 9 and kept at L level in other periods.

Thus, output transistor control circuit 181N turns on transistor MNC1 to turn off output transistor MNOUT at time t2 to t3 in response to detection of GND disconnection at time t2 in FIG. 9. Transistor MPC3, which is newly provided, is kept at the off state until time t3 with delay signal CMPBGD (H level). Therefore, in a period until time t3, the operation of output transistor control circuit 181N is the same as that of output transistor control circuit 180N.

After time t3, in output transistor control circuit 181N, transistor MPC3 turns on, so that voltage AVCC of power supply node NP is input to the gate of output transistor MNOUT. On the other and, since transistor MNC1 is turned off, output transistor MNOUT is turned on by a gate-source voltage produced by voltage AVCC. As a result, output transistor MNOUT allows GND node NG having GND disconnection to be electrically connected to reference voltage node 11, outside the semiconductor device, via output node No and output terminal 103. In other words, an embodiment of "pull-down circuit" can be configured using output transistor MNOUT controlled by output transistor control circuit 181N, without additionally arranging pull-down transistor MNOG.

Figure 32:
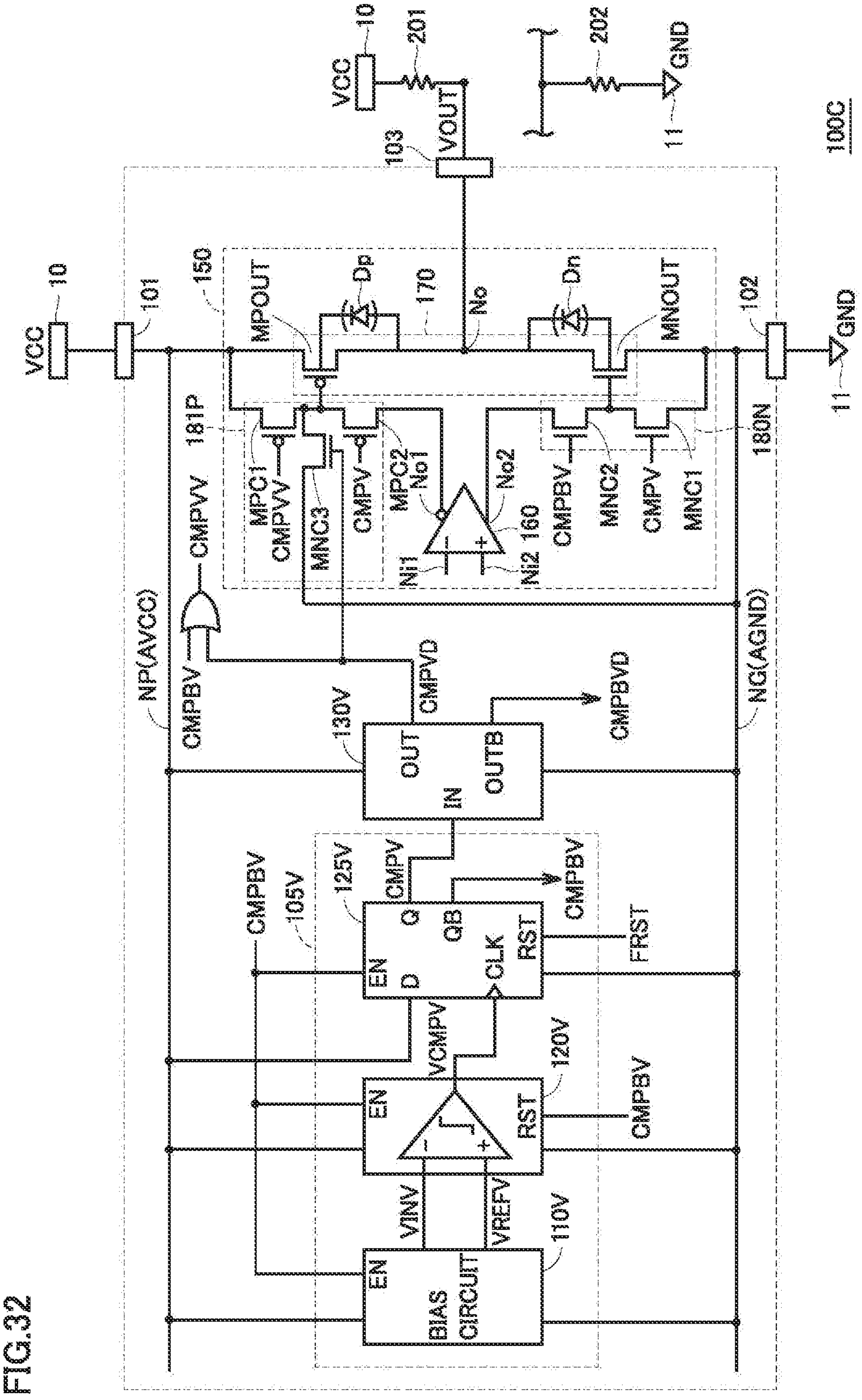
FIG. 32 is a circuit diagram illustrating a modification of a pull-up circuit in the semiconductor device according to the present embodiment.

FIG. 32 shows a modification of "pull-up circuit" in semiconductor device 100C shown in FIG. 18.

The modification in FIG. 32 differs from the configuration shown in FIG. 18 in that an output transistor control circuit 181P is arranged instead of output transistor control circuit 180P (FIG. 18) and that the arrangement of pull-up transistor MPOV (FIG. 18) is omitted.

Output transistor control circuit 181P differs from output transistor control circuit 180P in that it further includes an N-type transistor MNC3 in addition to P-type transistors MPC1, MPC2 and that a control signal CMPVV is input to the gate of transistor MPC1 instead of disconnection detection signal CMPBV (FIG. 18).

Transistor MNC3 is connected between GND node NG and the gate of output transistor MPOUT and receives delay signal CMPVD at the gate. Delay signal CMPVD is an inversion signal of delay signal CMPBVD and at L level until time t3 in FIG. 24 and set to H level after time t3.

Control signal CMPVV input to the gate of transistor MPC1 is generated by OR (logical disjunction) of disconnection detection signal CMPBV and delay signal CMPVD. Therefore, control signal CMPVV is set to L level between time t2 and t3 in FIG. 24 and kept at H level in other periods.

Thus, output transistor control circuit 181P turns on transistor MPC1 to turn off output transistor MPOUT at time t2 to t3 in response to detection of VCC disconnection at time t2 in FIG. 24. Transistor MNC3, which is newly provided, is kept at the off state until time t3 with delay signal CMPBVD (L level). Therefore, in a period until time t3, the operation of output transistor control circuit 181P is the same as that of output transistor control circuit 180P.

After time t3, in output transistor control circuit 181P, transistor MNC3 turns on, so that voltage AGND of GND node NG is input to the gate of output transistor MPOUT. On the other and, since transistor MPC1 is turned off, output transistor MPOUT is turned on by a gate-source voltage produced by voltage AGND. As a result, output transistor MPOUT allows power supply node NP having VCC disconnection to be electrically connected to power supply 10, outside the semiconductor device, via output node No and output terminal 103. In other words, an embodiment of "pull-up circuit" can be configured using output transistor MPOUT controlled by output transistor control circuit 181P, without additionally arranging pull-up transistor MPOV.

Further, also in each of FIG. 10, FIG. 14, FIG. 25, and FIG. 28 to FIG. 30, at least one of the arranged "pull-down circuit" and "pull-up circuit" can be configured according to the modification in FIG. 31 or FIG. 32.

In the present embodiment, an example in which abnormal current is handled in output stage 170 (output transistors MPOUT, MNOUT) of operational amplifier circuit 150 has been described. However, the present embodiment can be applied to a configuration in which an output voltage from any circuit block not limited to differential amplifier 160 is input to output stage 170. In other words, the configuration for handling GND disconnection or VCC disconnection according to the present embodiment can be applied to any circuit block arranged at a stage preceding output stage 170 to generate "first control voltage" and "second control voltage" input to the gates of output transistors MPOUT, MNOUT.

In particular, in semiconductor devices 100A to 100F described above, a configuration of analog output has been illustrated, in which an output voltage of differential amplifier 160 is input to output stage 170. However, even in a semiconductor device with digital output, the configuration described in the present first to third embodiments and modifications thereof can be applied to prevent abnormal current at a time of occurrence of disconnection. Specifically, a circuit block that outputs "first control voltage" and "second control voltage" so as to turn on (current>0) or off (current=0) each of output transistors MPOUT and MNOUT may be arranged at a stage preceding output stage 170.

Embodiments disclosed here should be understood as being illustrative rather than being limitative in all respects. The technical scope of the present disclosure is shown not in the foregoing description but in the claims, and it is intended that all modifications that come within the meaning and range of equivalence to the claims are embraced here.

REFERENCE SIGNS LIST

10 power supply, 11 reference voltage node, 100, 100A to 100F semiconductor device, 101 power supply terminal, 102 ground terminal, 103 output terminal, 105G, 105V disconnection detection circuit, 110G, 110V bias circuit, 120G, 120V comparator, 125G, 125V flip-flop, 130G, 130V delay circuit, 150 operational amplifier circuit, 160 differential amplifier, 170 output stage, 180N, 180P output transistor control circuit, 200*x*, 200*y* circuit group, 201 pull-up resistor, 202 pull-down resistor, 205 cut-off transistor, 206 circuit element, CMP, CMPB, CMPBG, CMPBV, CMPG, CMPV disconnection detection signal, CMPBGD, CMPBVD, CMPGD, CMPVD delay signal, Dn, Dp body diode, GND ground voltage, Iabn1, Iabn2 abnormal current, Itt1 total current value (entire IC), MNOG pull-down transistor, MNOUT, MPOUT output transistor, MPOV pull-up transistor, NG GND node, NP power supply node, No output node, No1 inversion output node, No2 non-inversion output node, Td delay time, VING, VINV, VREFV, VREV bias voltage, VOUT output voltage.

The invention claimed is:

1. A semiconductor device comprising:

a first power supply terminal receiving a first power supply voltage;

a second power supply terminal receiving a second power supply voltage higher than the first power supply voltage;

an output terminal capable of electrical contact from outside of the semiconductor device;

a first circuit having first and second output transistors, the first output transistor being electrically connected between an output node connected to the output terminal and the first power supply terminal to feed current in accordance with a first control voltage input to a gate of the first output transistor from the output node to the first power supply terminal, the second output transistor being electrically connected between the second power supply terminal and the output node to feed current in accordance with a second control voltage input to a gate of the second output transistor from the second power supply terminal to the output node;

a disconnection detection circuit to detect at least one disconnection of first disconnection in a path of the first power supply voltage related to the first power supply terminal and second disconnection in a path of the second power supply voltage related to the second power supply terminal; and an output transistor control circuit arranged corresponding to at least one of the first and second output transistors, wherein when the first disconnection is detected, the output transistor control circuit arranged corresponding to the first output transistor interrupts a path through which the first control voltage is input to the gate of the first output transistor, and turns off the first output transistor, when the second disconnection is detected, the output transistor control circuit arranged corresponding to the second output transistor interrupts a path through which the second control voltage is input to the gate of the second output transistor, and turns off the second output transistor, in response to detection of disconnection by the disconnection detection circuit, the semiconductor device transitions to a power-off state, and the disconnection detection circuit has a power-off circuit to interrupt current flowing between the first power supply terminal and the second power supply terminal inside the disconnection detection circuit, in the power-off state of the semiconductor device.

2. The semiconductor device according to claim 1, further comprising at least one of: a pull-down circuit provided together with the output transistor control circuit arranged corresponding to the first output transistor; and a pull-up circuit provided together with the output transistor control circuit arranged corresponding to the second output transistor, wherein when the disconnection detection circuit detects the first disconnection, the pull-down circuit operates after a delay from a timing when the semiconductor device transitions to the power-off state in response to the detection of the first disconnection, and electrically connects the first power supply terminal to the output terminal pulled down outside the semiconductor device, and when the disconnection detection circuit detects the second disconnection, the pull-up circuit operates after a delay from a timing when the semiconductor device transitions to the power-off state in response to the detection of the second disconnection, and electrically connects the second power supply terminal to the output terminal pulled up outside the semiconductor device.

3. The semiconductor device according to claim 1, further comprising a second circuit connected between the first and second power supply terminals, wherein the second circuit has a power-off circuit to interrupt current flowing between the first power supply terminal and the second power supply terminal inside the second circuit, in the power-off state of the semiconductor device.

4. The semiconductor device according to claim 1, wherein in the power-off state of the semiconductor device, a total current value flowing between the first power supply terminal and the second power supply terminal inside the semiconductor device is smaller than a limit current value set corresponding to a current level that does not cause a forward voltage in a body diode formed for each of the first and second output transistors.

5. The semiconductor device according to claim 4, wherein at least a part of a circuit group including the disconnection detection circuit and the first circuit connected between the first power supply terminal and the second power supply terminal has the power-off circuit, and the at least a part of the circuit group that has the power-off circuit is determined such that the total current value in the power-off state of the semiconductor device is lower than the limit current value.

6. The semiconductor device according claim 1, wherein the output transistor control circuit is arranged corresponding to each of the first and second output transistors, when the first or second disconnection is detected, the output transistor control circuit arranged corresponding to the first output transistor inputs a voltage for turning off the first output transistor to the gate of the first output transistor, instead of the first control voltage, and when the first or second disconnection is detected, the output transistor control circuit arranged corresponding to the second output transistor inputs a voltage for turning off the second output transistor to the gate of the second output transistor, instead of the second control voltage.

7. The semiconductor device according to claim 1, wherein at power-on of the semiconductor device, the disconnection detection circuit waits detection operation of the at least one disconnection until a voltage of the second power supply terminal rises to a predetermined voltage level or higher.

8. The semiconductor device according to claim 1, wherein the disconnection detection circuit detects at least one of the first and second disconnections, based on a comparison between a first bias voltage and a second bias voltage changing with a voltage difference between the first and second power supply terminals, and the first bias voltage is generated such that a voltage change smaller than a voltage change produced in the second bias voltage is produced for a common amount of change in the voltage difference between the first and second power supply terminals.

9. The semiconductor device according to claim 8, wherein the first bias voltage for detecting the first disconnection is generated using a forward voltage of a diode connected between the second power supply terminal and a node at which the first bias voltage is generated, in a series path connected between the first and second power supply terminals, the first bias voltage for detecting the second disconnection is generated using a forward voltage of a diode connected between the first power supply terminal and a node at which the first bias voltage is generated, in a series path connected between the first and second power supply terminals, and the second bias voltage is generated by dividing the voltage difference between the first and second power supply terminals.

* * * * *